United States Patent
Robinson et al.

(10) Patent No.: US 12,494,695 B2
(45) Date of Patent: Dec. 9, 2025

(54) ENCODERLESS VECTOR CONTROL FOR VFD IN HYDRAULIC FRACTURING APPLICATIONS

(71) Applicant: U.S. Well Services, LLC, Houston, TX (US)

(72) Inventors: Lon Robinson, Houston, TX (US); Jared Oehring, Houston, TX (US); Brandon N. Hinderliter, Houston, TX (US)

(73) Assignee: U.S. WELL SERVICES, LLC, Willow Park, TX (US)

( * ) Notice: Subject to any disclaimer, the term of this patent is extended or adjusted under 35 U.S.C. 154(b) by 116 days.

(21) Appl. No.: 18/217,442

(22) Filed: Jun. 30, 2023

(65) Prior Publication Data
US 2023/0353017 A1     Nov. 2, 2023

Related U.S. Application Data

(63) Continuation of application No. 16/873,583, filed on May 12, 2020, now Pat. No. 11,728,709.
(Continued)

(51) Int. Cl.
*H02K 7/14*     (2006.01)
*H02K 7/18*     (2006.01)
(Continued)

(52) U.S. Cl.
CPC ............. *H02K 7/1823* (2013.01); *H02K 7/14* (2013.01); *H02K 11/33* (2016.01);
(Continued)

(58) Field of Classification Search
CPC .......... F04B 23/06; F04B 15/02; F04B 17/03; F01D 21/003; F01D 15/10; H02P 21/18;
(Continued)

(56) References Cited

U.S. PATENT DOCUMENTS

| 1,541,601 A | 6/1925 | Tribe |
| 1,656,861 A | 1/1928 | Leonard |

(Continued)

FOREIGN PATENT DOCUMENTS

| AU | 2011203353 A1 | 7/2011 |
| CA | 2158637 A1 | 9/1994 |

(Continued)

OTHER PUBLICATIONS

Arvani et al., "Design and Development of an Engineering Drilling Simulator and Application for Offshore Drilling for MODUs and Deepwater Environments," Society of Petroleum Engineers, SPE-170301-MS, 2014, 17 pages.
(Continued)

*Primary Examiner* — Alexander A Singh
(74) *Attorney, Agent, or Firm* — Abel Schillinger, LLP

(57) ABSTRACT

A system and a method for use of electric motors in fracturing operations are disclosed. The system includes an electric motor, a turbine generator, an encoderless vector control subsystem, and at least one pump. The turbine generator is adapted to generate electric power for the system. The encoderless vector control subsystem is coupled between the turbine generator and the electric motor to control the electric motor using determined parameters that are based in part on vibration induced in a feature associated with the turbine generator. The at least one pump is adapted to receive torque input from the electric motor.

18 Claims, 8 Drawing Sheets

Related U.S. Application Data

(60) Provisional application No. 62/847,022, filed on May 13, 2019.

(51) Int. Cl.
*H02K 11/33* (2016.01)
*E21B 43/26* (2006.01)
*E21B 43/28* (2006.01)
*F01D 15/10* (2006.01)
*F04B 17/03* (2006.01)
*H02P 21/05* (2006.01)
*H02P 23/00* (2016.01)

(52) U.S. Cl.
CPC ......... *E21B 43/2607* (2020.05); *E21B 43/283* (2013.01); *F01D 15/10* (2013.01); *F04B 17/03* (2013.01); *F05D 2220/32* (2013.01); *F05D 2260/83* (2013.01); *H02P 21/05* (2013.01); *H02P 23/0004* (2013.01)

(58) Field of Classification Search
CPC ....... H02P 21/05; H02P 23/0004; H02K 7/14; H02K 7/1823; H02K 11/33; E21B 43/2607; E21B 43/283; F05D 2260/83; F05D 2270/334; F05D 2220/76; F05D 2220/32

See application file for complete search history.

(56) References Cited

U.S. PATENT DOCUMENTS

| | | |
|---|---|---|
| 1,671,436 A | 5/1928 | Melott |
| 1,743,771 A | 1/1930 | Hall et al. |
| 1,967,466 A | 7/1934 | Damsel |
| 2,004,077 A | 6/1935 | McCartney et al. |
| 2,183,364 A | 12/1939 | Bailey |
| 2,220,622 A | 11/1940 | Aitken |
| 2,237,812 A | 4/1941 | De Blieux et al. |
| 2,244,106 A | 6/1941 | Granberg |
| 2,248,051 A | 7/1941 | Armstrong |
| 2,389,328 A | 11/1945 | Stilwell |
| 2,407,796 A | 9/1946 | Page |
| 2,416,848 A | 3/1947 | Rothery |
| 2,610,741 A | 9/1952 | Schmid |
| 2,753,940 A | 7/1956 | Bonner |
| 2,852,600 A | 9/1958 | Jenkins, Jr. |
| 2,976,025 A | 3/1961 | Pro |
| 3,055,682 A | 9/1962 | Bacher et al. |
| 3,061,039 A | 10/1962 | Peters |
| 3,066,503 A | 12/1962 | Fleming et al. |
| 3,116,086 A | 12/1963 | Barengoltz |
| 3,302,069 A | 1/1967 | Webster |
| 3,334,495 A | 8/1967 | Jensen et al. |
| 3,347,570 A | 10/1967 | Roessler |
| 3,601,198 A | 8/1971 | Ahearn et al. |
| 3,722,595 A | 3/1973 | Kiel |
| 3,764,233 A | 10/1973 | Strickland |
| 3,773,140 A | 11/1973 | Mahajan et al. |
| 3,794,846 A | 2/1974 | Schlicher et al. |
| 3,837,179 A | 9/1974 | Barth |
| 3,849,662 A | 11/1974 | Blaskowski et al. |
| 3,878,884 A | 4/1975 | Raleigh |
| 3,881,551 A | 5/1975 | Terry et al. |
| 3,967,841 A | 7/1976 | Kendrick et al. |
| 3,978,877 A | 9/1976 | Cox |
| 4,037,431 A | 7/1977 | Sugimoto |
| 4,066,869 A | 1/1978 | Apaloo et al. |
| 4,100,822 A | 7/1978 | Rosman |
| 4,151,575 A | 4/1979 | Hogue |
| 4,226,299 A | 10/1980 | Hansen |
| 4,265,266 A | 5/1981 | Kierbow et al. |
| 4,411,313 A | 10/1983 | Johnson et al. |
| 4,421,975 A | 12/1983 | Stein |
| 4,432,064 A | 2/1984 | Barker et al. |
| 4,442,665 A | 4/1984 | Fick et al. |
| 4,456,092 A | 6/1984 | Kubozuka et al. |
| 4,506,982 A | 3/1985 | Smithers et al. |
| 4,512,387 A | 4/1985 | Rodriguez et al. |
| 4,529,887 A | 7/1985 | Johnson |
| 4,538,916 A | 9/1985 | Zimmerman |
| 4,562,360 A | 12/1985 | Fujimoto |
| 4,601,629 A | 7/1986 | Zimmerman |
| 4,676,063 A | 6/1987 | Goebel et al. |
| 4,759,674 A | 7/1988 | Schroder |
| 4,768,884 A | 9/1988 | Elkin |
| 4,783,038 A | 11/1988 | Gilbert et al. |
| 4,793,386 A | 12/1988 | Sloan |
| 4,845,981 A | 7/1989 | Pearson |
| 4,877,956 A | 10/1989 | Priest |
| 4,898,473 A | 2/1990 | Stegemoeller et al. |
| 4,922,463 A | 5/1990 | Del Zotto et al. |
| 5,004,400 A | 4/1991 | Handke |
| 5,006,044 A | 4/1991 | Walker, Sr. et al. |
| 5,025,861 A | 6/1991 | Huber et al. |
| 5,050,673 A | 9/1991 | Baldridge |
| 5,114,239 A | 5/1992 | Allen |
| 5,130,628 A | 7/1992 | Owen |
| 5,131,472 A | 7/1992 | Dees et al. |
| 5,134,328 A | 7/1992 | Johnatakis et al. |
| 5,172,009 A | 12/1992 | Mohan |
| 5,189,388 A | 2/1993 | Mosley et al. |
| 5,230,366 A | 7/1993 | Marandi |
| 5,293,947 A | 3/1994 | Stratton |
| 5,334,898 A | 8/1994 | Skybyk |
| 5,334,899 A | 8/1994 | Skybyk |
| 5,366,324 A | 11/1994 | Arlt |
| 5,422,550 A | 6/1995 | McClanahan et al. |
| 5,433,243 A | 7/1995 | Griswold et al. |
| 5,439,066 A | 8/1995 | Gipson |
| 5,486,047 A | 1/1996 | Zimmerman |
| 5,517,593 A | 5/1996 | Nenniger et al. |
| 5,517,822 A | 5/1996 | Haws et al. |
| 5,548,093 A | 8/1996 | Sato et al. |
| 5,549,285 A | 8/1996 | Collins |
| 5,590,976 A | 1/1997 | Kilheffer et al. |
| 5,606,853 A | 3/1997 | Birch |
| 5,655,361 A | 8/1997 | Kishi |
| 5,712,802 A | 1/1998 | Kumar et al. |
| 5,736,838 A | 4/1998 | Dove et al. |
| 5,755,096 A | 5/1998 | Holleyman |
| 5,790,972 A | 8/1998 | Kohlenberger |
| 5,791,636 A | 8/1998 | Loziuk |
| 5,798,596 A | 8/1998 | Lordo |
| 5,813,455 A | 9/1998 | Pratt et al. |
| 5,865,247 A | 2/1999 | Paterson et al. |
| 5,879,137 A | 3/1999 | Yie |
| 5,894,888 A | 4/1999 | Wiemers et al. |
| 5,907,970 A | 6/1999 | Havlovick et al. |
| 5,950,726 A | 9/1999 | Roberts |
| 6,007,227 A | 12/1999 | Carlson |
| 6,035,265 A | 3/2000 | Dister et al. |
| 6,059,539 A | 5/2000 | Nyilas et al. |
| 6,097,310 A | 8/2000 | Harrell et al. |
| 6,116,040 A | 9/2000 | Stark |
| 6,121,705 A | 9/2000 | Hoong |
| 6,138,764 A | 10/2000 | Scarsdale et al. |
| 6,142,878 A | 11/2000 | Barin |
| 6,164,910 A | 12/2000 | Mayleben |
| 6,167,965 B1 | 1/2001 | Bearden et al. |
| 6,202,702 B1 | 3/2001 | Ohira et al. |
| 6,208,098 B1 | 3/2001 | Kume et al. |
| 6,254,462 B1 | 7/2001 | Kelton et al. |
| 6,271,637 B1 | 8/2001 | Kushion |
| 6,273,193 B1 | 8/2001 | Hermann et al. |
| 6,315,523 B1 | 11/2001 | Mills |
| 6,321,860 B1 | 11/2001 | Reddoch |
| 6,406,011 B1 | 6/2002 | Kosar et al. |
| 6,442,942 B1 | 9/2002 | Kopko |
| 6,477,852 B2 | 11/2002 | Dodo et al. |
| 6,484,490 B1 | 11/2002 | Olsen |
| 6,491,098 B1 | 12/2002 | Dallas |
| 6,510,695 B1 | 1/2003 | Fisher |
| 6,529,135 B1 | 3/2003 | Bowers et al. |

(56) References Cited

U.S. PATENT DOCUMENTS

| | | |
|---|---|---|
| 6,585,455 B1 | 7/2003 | Petersen et al. |
| 6,626,646 B2 | 9/2003 | Rajewski |
| 6,633,727 B2 | 10/2003 | Henrie et al. |
| 6,719,900 B2 | 4/2004 | Hawkins |
| 6,765,304 B2 | 7/2004 | Baten et al. |
| 6,776,227 B2 | 8/2004 | Beida et al. |
| 6,786,051 B2 | 9/2004 | Kristich et al. |
| 6,788,022 B2 | 9/2004 | Sopko et al. |
| 6,802,690 B2 | 10/2004 | Han et al. |
| 6,808,303 B2 | 10/2004 | Fisher |
| 6,837,910 B1 | 1/2005 | Yoshikawa et al. |
| 6,857,486 B2 | 2/2005 | Chitwood et al. |
| 6,931,310 B2 | 8/2005 | Shimizu et al. |
| 6,936,947 B1 | 8/2005 | Leijon |
| 6,985,750 B1 | 1/2006 | Vicknair et al. |
| 7,006,792 B2 | 2/2006 | Wilson |
| 7,011,152 B2 | 3/2006 | Soelvik |
| 7,082,993 B2 | 8/2006 | Ayoub |
| 7,104,233 B2 | 9/2006 | Ryczek et al. |
| 7,170,262 B2 | 1/2007 | Pettigrew |
| 7,173,399 B2 | 2/2007 | Sihler et al. |
| 7,279,655 B2 | 10/2007 | Blutke et al. |
| 7,308,933 B1 | 12/2007 | Mayfield |
| 7,309,835 B2 | 12/2007 | Morrison et al. |
| 7,312,593 B1 | 12/2007 | Streicher et al. |
| 7,336,514 B2 | 2/2008 | Amarillas et al. |
| 7,341,287 B2 | 3/2008 | Gibb et al. |
| 7,445,041 B2 | 11/2008 | O'Brien |
| 7,494,263 B2 | 2/2009 | Dykstra et al. |
| 7,500,642 B2 | 3/2009 | Cunningham et al. |
| 7,525,264 B2 | 4/2009 | Dodge |
| 7,563,076 B2 | 7/2009 | Brunet et al. |
| 7,581,379 B2 | 9/2009 | Yoshida |
| 7,660,648 B2 | 2/2010 | Dykstra |
| 7,675,189 B2 | 3/2010 | Grenier |
| 7,683,499 B2 | 3/2010 | Saucier |
| 7,717,193 B2 | 5/2010 | Egilsson et al. |
| 7,755,310 B2 | 7/2010 | West et al. |
| 7,770,396 B2 | 8/2010 | Roby et al. |
| 7,795,830 B2 | 9/2010 | Johnson |
| 7,807,048 B2 | 10/2010 | Collette |
| 7,835,140 B2 | 11/2010 | Mori |
| 7,845,413 B2 | 12/2010 | Shampine et al. |
| 7,900,893 B2 | 3/2011 | Teurlay et al. |
| 7,901,314 B2 | 3/2011 | Salvaire et al. |
| 7,926,562 B2 | 4/2011 | Poitzsch |
| 7,940,039 B2 | 5/2011 | De Buda |
| 7,949,483 B2 | 5/2011 | Discenzo et al. |
| 7,971,650 B2 | 7/2011 | Yuratich et al. |
| 7,977,824 B2 | 7/2011 | Halen et al. |
| 7,984,757 B1 | 7/2011 | Keast |
| 8,037,936 B2 | 10/2011 | Neuroth et al. |
| 8,054,084 B2 | 11/2011 | Schulz et al. |
| 8,069,710 B2 | 12/2011 | Dodd et al. |
| 8,083,504 B2 | 12/2011 | Williams et al. |
| 8,091,928 B2 | 1/2012 | Carrier et al. |
| 8,096,354 B2 | 1/2012 | Poitzsch |
| 8,096,891 B2 | 1/2012 | Lochtefeld et al. |
| 8,139,383 B2 | 3/2012 | Efraimsson et al. |
| 8,146,665 B2 | 4/2012 | Neal |
| 8,154,419 B2 | 4/2012 | Daussin et al. |
| 8,174,853 B2 | 5/2012 | Kane et al. |
| 8,221,513 B2 | 7/2012 | Ariyapadi et al. |
| 8,232,892 B2 | 7/2012 | Overholt et al. |
| 8,261,528 B2 | 9/2012 | Chillar et al. |
| 8,272,439 B2 | 9/2012 | Strickland |
| 8,310,272 B2 | 11/2012 | Quarto |
| 8,354,817 B2 | 1/2013 | Yeh et al. |
| 8,379,424 B2 | 2/2013 | Grbovic |
| 8,469,097 B2 | 6/2013 | Cochran et al. |
| 8,474,521 B2 | 7/2013 | Kajaria et al. |
| RE44,444 E | 8/2013 | Dole et al. |
| 8,503,180 B2 | 8/2013 | Nojima |
| 8,506,267 B2 | 8/2013 | Gambier et al. |
| 8,534,235 B2 | 9/2013 | Chandler |
| 8,534,366 B2 | 9/2013 | Fielder et al. |
| 8,556,302 B2 | 10/2013 | Dole |
| 8,573,303 B2 | 11/2013 | Kerfoot |
| 8,596,056 B2 | 12/2013 | Woodmansee et al. |
| 8,616,005 B1 | 12/2013 | Cousino |
| 8,616,274 B2 | 12/2013 | Belcher et al. |
| 8,622,128 B2 | 1/2014 | Hegeman |
| 8,628,627 B2 | 1/2014 | Sales et al. |
| 8,646,521 B2 | 2/2014 | Bowen |
| 8,692,408 B2 | 4/2014 | Zhang et al. |
| 8,727,068 B2 | 5/2014 | Bruin |
| 8,727,737 B2 | 5/2014 | Seitter |
| 8,727,783 B2 | 5/2014 | Chen |
| 8,760,657 B2 | 6/2014 | Pope et al. |
| 8,763,387 B2 | 7/2014 | Schmidt |
| 8,774,972 B2 | 7/2014 | Rusnak et al. |
| 8,789,601 B2 | 7/2014 | Broussard et al. |
| 8,789,609 B2 | 7/2014 | Smith et al. |
| 8,795,525 B2 | 8/2014 | McGinnis et al. |
| 8,800,652 B2 | 8/2014 | Bartko |
| 8,807,960 B2 | 8/2014 | Stephenson et al. |
| 8,838,341 B2 | 9/2014 | Kumano |
| 8,851,860 B1 | 10/2014 | Mail |
| 8,857,506 B2 | 10/2014 | Stone, Jr. et al. |
| 8,874,383 B2 | 10/2014 | Gambier et al. |
| 8,893,787 B2 | 11/2014 | Tips et al. |
| 8,899,940 B2 | 12/2014 | Laugemors et al. |
| 8,905,056 B2 | 12/2014 | Kendrick |
| 8,905,138 B2 | 12/2014 | Lundstedt et al. |
| 8,997,904 B2 | 4/2015 | Cryer et al. |
| 9,018,881 B2 | 4/2015 | Mao et al. |
| 9,051,822 B2 | 6/2015 | Ayan et al. |
| 9,051,923 B2 | 6/2015 | Kuo |
| 9,061,223 B2 | 6/2015 | Winborn |
| 9,062,545 B2 | 6/2015 | Roberts et al. |
| 9,067,182 B2 | 6/2015 | Nichols et al. |
| 9,080,412 B2 | 7/2015 | Wetzel et al. |
| 9,103,193 B2 | 8/2015 | Coli et al. |
| 9,119,326 B2 | 8/2015 | McDonnell |
| 9,121,257 B2 | 9/2015 | Coli et al. |
| 9,140,105 B2 | 9/2015 | Pattillo |
| 9,140,110 B2 | 9/2015 | Coli et al. |
| 9,160,168 B2 | 10/2015 | Chapel |
| 9,260,253 B2 | 2/2016 | Naizer et al. |
| 9,322,239 B2 | 4/2016 | Angeles Boza et al. |
| 9,324,049 B2 | 4/2016 | Thomeer |
| 9,340,353 B2 | 5/2016 | Oren et al. |
| 9,353,593 B1 | 5/2016 | Lu et al. |
| 9,366,114 B2 | 6/2016 | Coli et al. |
| 9,410,410 B2 | 8/2016 | Broussard et al. |
| 9,450,385 B2 | 9/2016 | Kristensen |
| 9,475,020 B2 | 10/2016 | Coli et al. |
| 9,475,021 B2 | 10/2016 | Coli et al. |
| 9,475,840 B2 | 10/2016 | Lledó et al. |
| 9,482,086 B2 | 11/2016 | Richardson et al. |
| 9,499,335 B2 | 11/2016 | McIver et al. |
| 9,506,333 B2 | 11/2016 | Castillo et al. |
| 9,513,055 B1 | 12/2016 | Seal |
| 9,534,473 B2 | 1/2017 | Morris et al. |
| 9,562,420 B2 | 2/2017 | Morris et al. |
| 9,587,649 B2 | 3/2017 | Oehring |
| 9,611,728 B2 | 4/2017 | Oehring |
| 9,650,871 B2 | 5/2017 | Oehring et al. |
| 9,650,879 B2 | 5/2017 | Broussard et al. |
| 9,706,185 B2 | 7/2017 | Ellis |
| 9,728,354 B2 | 8/2017 | Skolozdra |
| 9,738,461 B2 | 8/2017 | DeGaray et al. |
| 9,739,546 B2 | 8/2017 | Bertilsson et al. |
| 9,745,840 B2 | 8/2017 | Oehring et al. |
| 9,790,858 B2 | 10/2017 | Kanebako |
| 9,822,631 B2 | 11/2017 | Ravi et al. |
| 9,840,897 B2 | 12/2017 | Larson |
| 9,840,901 B2 | 12/2017 | Oehring et al. |
| 9,841,026 B2 | 12/2017 | Stinessen et al. |
| 9,863,228 B2 | 1/2018 | Shampine et al. |
| RE46,725 E | 2/2018 | Case et al. |
| 9,893,500 B2 | 2/2018 | Oehring et al. |
| 9,903,190 B2 | 2/2018 | Conrad et al. |
| 9,909,398 B2 | 3/2018 | Pham |

(56) References Cited

U.S. PATENT DOCUMENTS

| | | |
|---|---|---|
| 9,915,128 B2 | 3/2018 | Hunter |
| 9,932,799 B2 | 4/2018 | Symchuk |
| 9,945,365 B2 | 4/2018 | Hernandez et al. |
| 9,963,961 B2 | 5/2018 | Hardin |
| 9,970,278 B2 | 5/2018 | Broussard et al. |
| 9,976,351 B2 | 5/2018 | Randall |
| 9,995,218 B2 | 6/2018 | Oehring et al. |
| 10,008,880 B2 | 6/2018 | Vicknair |
| 10,020,711 B2 | 7/2018 | Oehring et al. |
| 10,036,238 B2 | 7/2018 | Oehring |
| 10,107,086 B2 | 10/2018 | Oehring et al. |
| 10,119,381 B2 | 11/2018 | Oehring et al. |
| 10,167,863 B1 | 1/2019 | Cook et al. |
| 10,184,465 B2 | 1/2019 | Enis et al. |
| 10,196,878 B2 | 2/2019 | Hunter |
| 10,221,639 B2 | 3/2019 | Romer et al. |
| 10,227,854 B2 | 3/2019 | Glass |
| 10,232,332 B2 | 3/2019 | Oehring |
| 10,246,984 B2 | 4/2019 | Payne |
| 10,254,732 B2 | 4/2019 | Oehring et al. |
| 10,260,327 B2 | 4/2019 | Kajaria |
| 10,280,724 B2 | 5/2019 | Hinderliter |
| 10,287,873 B2 | 5/2019 | Filas |
| 10,302,079 B2 | 5/2019 | Kendrick |
| 10,309,205 B2 | 6/2019 | Randall |
| 10,337,308 B2 | 7/2019 | Broussard et al. |
| 10,371,012 B2 | 8/2019 | Davis |
| 10,378,326 B2 | 8/2019 | Morris |
| 10,393,108 B2 | 8/2019 | Chong |
| 10,407,990 B2 | 9/2019 | Oehring |
| 10,408,030 B2 | 9/2019 | Oehring et al. |
| 10,408,031 B2 | 9/2019 | Oehring et al. |
| 10,415,332 B2 | 9/2019 | Morris et al. |
| 10,436,026 B2 | 10/2019 | Ounadjela |
| 10,443,660 B2 | 10/2019 | Harris |
| 10,526,882 B2 | 1/2020 | Oehring et al. |
| 10,627,003 B2 | 4/2020 | Dale et al. |
| 10,648,270 B2 | 5/2020 | Brunty et al. |
| 10,648,311 B2 | 5/2020 | Oehring et al. |
| 10,669,471 B2 | 6/2020 | Schmidt et al. |
| 10,669,804 B2 | 6/2020 | Kotrla et al. |
| 10,686,301 B2 | 6/2020 | Oehring et al. |
| 10,690,131 B2 | 6/2020 | Rashid et al. |
| 10,695,950 B2 | 6/2020 | Igo et al. |
| 10,711,576 B2 | 7/2020 | Bishop |
| 10,731,561 B2 | 8/2020 | Oehring et al. |
| 10,740,730 B2 | 8/2020 | Altamirano et al. |
| 10,767,561 B2 | 9/2020 | Brady |
| 10,781,752 B2 | 9/2020 | Kikkawa et al. |
| 10,794,165 B2 | 10/2020 | Fischer et al. |
| 10,934,824 B2 | 3/2021 | Oehring et al. |
| 10,988,998 B2 | 4/2021 | Fischer et al. |
| 11,091,992 B2 | 8/2021 | Broussard |
| 2001/0000996 A1 | 5/2001 | Grimland et al. |
| 2002/0169523 A1 | 11/2002 | Ross et al. |
| 2003/0056514 A1 | 3/2003 | Lohn |
| 2003/0057704 A1 | 3/2003 | Baten et al. |
| 2003/0079875 A1 | 5/2003 | Weng |
| 2003/0138327 A1 | 7/2003 | Jones et al. |
| 2004/0040746 A1 | 3/2004 | Niedermayr et al. |
| 2004/0045703 A1 | 3/2004 | Hooper et al. |
| 2004/0102109 A1 | 5/2004 | Cratty et al. |
| 2004/0167738 A1 | 8/2004 | Miller |
| 2004/0212679 A1 | 10/2004 | Jun |
| 2005/0061548 A1 | 3/2005 | Hooper |
| 2005/0116541 A1 | 6/2005 | Seiver |
| 2005/0201197 A1 | 9/2005 | Duell et al. |
| 2005/0274508 A1 | 12/2005 | Folk et al. |
| 2006/0052903 A1 | 3/2006 | Bassett |
| 2006/0065319 A1 | 3/2006 | Csitari |
| 2006/0109141 A1 | 5/2006 | Huang et al. |
| 2007/0125544 A1 | 6/2007 | Robinson et al. |
| 2007/0131410 A1 | 6/2007 | Hill et al. |
| 2007/0151731 A1 | 7/2007 | Butler et al. |
| 2007/0187163 A1 | 8/2007 | Cone et al. |
| 2007/0201305 A1 | 8/2007 | Heilman et al. |
| 2007/0204991 A1 | 9/2007 | Loree et al. |
| 2007/0226089 A1 | 9/2007 | DeGaray et al. |
| 2007/0277982 A1 | 12/2007 | Shampine et al. |
| 2007/0278140 A1 | 12/2007 | Mallet et al. |
| 2008/0017369 A1 | 1/2008 | Sarada |
| 2008/0041596 A1 | 2/2008 | Blount |
| 2008/0066911 A1 | 3/2008 | Luharuka et al. |
| 2008/0095644 A1 | 4/2008 | Mantei et al. |
| 2008/0112802 A1 | 5/2008 | Orlando et al. |
| 2008/0137266 A1 | 6/2008 | Jensen et al. |
| 2008/0142304 A1 | 6/2008 | Schutz et al. |
| 2008/0164023 A1 | 7/2008 | Dykstra et al. |
| 2008/0187444 A1 | 8/2008 | Molotkov et al. |
| 2008/0208478 A1 | 8/2008 | Ella et al. |
| 2008/0217024 A1 | 9/2008 | Moore |
| 2008/0236818 A1 | 10/2008 | Dykstra |
| 2008/0257449 A1 | 10/2008 | Weinstein et al. |
| 2008/0264625 A1 | 10/2008 | Ochoa |
| 2008/0264649 A1 | 10/2008 | Crawford |
| 2008/0277120 A1 | 11/2008 | Hickie |
| 2008/0288115 A1 | 11/2008 | Rusnak et al. |
| 2008/0303469 A1 | 12/2008 | Nojima |
| 2009/0045782 A1 | 2/2009 | Datta et al. |
| 2009/0065299 A1 | 3/2009 | Vito et al. |
| 2009/0068031 A1 | 3/2009 | Gambier et al. |
| 2009/0068301 A1 | 3/2009 | Huang |
| 2009/0072645 A1 | 3/2009 | Quere |
| 2009/0078410 A1 | 3/2009 | Krenek et al. |
| 2009/0093317 A1 | 4/2009 | Kajiwara et al. |
| 2009/0095482 A1 | 4/2009 | Surjaatmadja |
| 2009/0101410 A1 | 4/2009 | Egilsson et al. |
| 2009/0114392 A1 | 5/2009 | Tolman et al. |
| 2009/0122578 A1 | 5/2009 | Beltran |
| 2009/0145611 A1 | 6/2009 | Pallini, Jr. |
| 2009/0153354 A1 | 6/2009 | Daussin et al. |
| 2009/0188181 A1 | 7/2009 | Forbis et al. |
| 2009/0194273 A1 | 8/2009 | Surjaatmadja et al. |
| 2009/0200035 A1 | 8/2009 | Bjerkreim et al. |
| 2009/0200290 A1 | 8/2009 | Cardinal et al. |
| 2009/0260826 A1 | 10/2009 | Sherwood et al. |
| 2009/0308602 A1 | 12/2009 | Bruins et al. |
| 2009/0315297 A1 | 12/2009 | Nadeau et al. |
| 2010/0000508 A1 | 1/2010 | Chandler |
| 2010/0019574 A1 | 1/2010 | Baldassarre et al. |
| 2010/0038077 A1 | 2/2010 | Heilman et al. |
| 2010/0038907 A1 | 2/2010 | Hunt |
| 2010/0045109 A1 | 2/2010 | Arnold |
| 2010/0051272 A1 | 3/2010 | Loree et al. |
| 2010/0132949 A1 | 6/2010 | DeFosse et al. |
| 2010/0146981 A1 | 6/2010 | Motakef et al. |
| 2010/0172202 A1 | 7/2010 | Borgstadt |
| 2010/0193057 A1 | 8/2010 | Garner et al. |
| 2010/0250139 A1 | 9/2010 | Hobbs et al. |
| 2010/0281876 A1 | 11/2010 | Khan et al. |
| 2010/0293973 A1 | 11/2010 | Erickson |
| 2010/0300683 A1 | 12/2010 | Looper et al. |
| 2010/0303655 A1 | 12/2010 | Scekic |
| 2010/0310384 A1 | 12/2010 | Stephenson et al. |
| 2010/0322802 A1 | 12/2010 | Kugelev |
| 2011/0005757 A1 | 1/2011 | Hebert |
| 2011/0017468 A1 | 1/2011 | Birch et al. |
| 2011/0042387 A1 | 2/2011 | Henry et al. |
| 2011/0052423 A1 | 3/2011 | Gambier et al. |
| 2011/0061855 A1 | 3/2011 | Case et al. |
| 2011/0063942 A1 | 3/2011 | Hagan et al. |
| 2011/0079302 A1 | 4/2011 | Hawes |
| 2011/0081268 A1 | 4/2011 | Ochoa et al. |
| 2011/0085924 A1 | 4/2011 | Shampine et al. |
| 2011/0097988 A1 | 4/2011 | Lord |
| 2011/0110793 A1 | 5/2011 | Leugemores et al. |
| 2011/0166046 A1 | 7/2011 | Weaver et al. |
| 2011/0175397 A1 | 7/2011 | Amrine, Jr. et al. |
| 2011/0194256 A1 | 8/2011 | De Rijck et al. |
| 2011/0197988 A1 | 8/2011 | Van Vliet et al. |
| 2011/0241590 A1 | 10/2011 | Horikoshi et al. |
| 2011/0247831 A1 | 10/2011 | Smith et al. |
| 2011/0247878 A1 | 10/2011 | Rasheed |
| 2011/0272158 A1 | 11/2011 | Neal |

(56) References Cited

U.S. PATENT DOCUMENTS

| | | |
|---|---|---|
| 2012/0018016 A1 | 1/2012 | Gibson et al. |
| 2012/0049625 A1 | 3/2012 | Hopwood |
| 2012/0063936 A1 | 3/2012 | Baxter et al. |
| 2012/0067582 A1 | 3/2012 | Fincher |
| 2012/0085541 A1 | 4/2012 | Love et al. |
| 2012/0111560 A1 | 5/2012 | Hill et al. |
| 2012/0112757 A1 | 5/2012 | Vrankovic et al. |
| 2012/0127635 A1 | 5/2012 | Grindeland |
| 2012/0150455 A1 | 6/2012 | Franklin et al. |
| 2012/0152549 A1 | 6/2012 | Koroteev et al. |
| 2012/0152716 A1 | 6/2012 | Kikukawa et al. |
| 2012/0205112 A1 | 8/2012 | Pettigrew et al. |
| 2012/0205119 A1 | 8/2012 | Wentworth et al. |
| 2012/0205301 A1 | 8/2012 | McGuire et al. |
| 2012/0205400 A1 | 8/2012 | DeGaray et al. |
| 2012/0217067 A1 | 8/2012 | Mebane, III et al. |
| 2012/0222865 A1 | 9/2012 | Larson |
| 2012/0232728 A1 | 9/2012 | Karimi et al. |
| 2012/0247783 A1 | 10/2012 | Berner, Jr. |
| 2012/0255734 A1 | 10/2012 | Coli et al. |
| 2013/0009469 A1 | 1/2013 | Gillett |
| 2013/0025706 A1 | 1/2013 | DeGaray et al. |
| 2013/0051971 A1 | 2/2013 | Wyse et al. |
| 2013/0064528 A1 | 3/2013 | Bigex et al. |
| 2013/0078114 A1 | 3/2013 | Van Rijswick et al. |
| 2013/0138254 A1 | 5/2013 | Seals et al. |
| 2013/0175038 A1 | 7/2013 | Conrad |
| 2013/0175039 A1 | 7/2013 | Guidry |
| 2013/0180722 A1 | 7/2013 | Caro et al. |
| 2013/0189629 A1 | 7/2013 | Chandler |
| 2013/0199617 A1 | 8/2013 | DeGaray et al. |
| 2013/0233542 A1 | 9/2013 | Shampine et al. |
| 2013/0242688 A1 | 9/2013 | Kageler |
| 2013/0255271 A1 | 10/2013 | Yu et al. |
| 2013/0278183 A1 | 10/2013 | Liang et al. |
| 2013/0284278 A1 | 10/2013 | Winborn |
| 2013/0284455 A1 | 10/2013 | Kajaria et al. |
| 2013/0299167 A1 | 11/2013 | Fordyce et al. |
| 2013/0306322 A1 | 11/2013 | Sanborn et al. |
| 2013/0317750 A1 | 11/2013 | Hunter |
| 2013/0341029 A1 | 12/2013 | Roberts et al. |
| 2013/0343858 A1 | 12/2013 | Flusche |
| 2014/0000899 A1 | 1/2014 | Nevison |
| 2014/0010671 A1 | 1/2014 | Cryer et al. |
| 2014/0041730 A1 | 2/2014 | Naizer et al. |
| 2014/0048255 A1 | 2/2014 | Baca et al. |
| 2014/0054965 A1 | 2/2014 | Jain |
| 2014/0060658 A1 | 3/2014 | Hains |
| 2014/0077607 A1 | 3/2014 | Clarke et al. |
| 2014/0095114 A1 | 4/2014 | Thomeer et al. |
| 2014/0096974 A1 | 4/2014 | Coli et al. |
| 2014/0124162 A1 | 5/2014 | Leavitt |
| 2014/0127036 A1 | 5/2014 | Buckley et al. |
| 2014/0138079 A1 | 5/2014 | Broussard et al. |
| 2014/0147310 A1 | 5/2014 | Hunt et al. |
| 2014/0158345 A1 | 6/2014 | Jang et al. |
| 2014/0174717 A1 | 6/2014 | Broussard et al. |
| 2014/0205475 A1 | 7/2014 | Dale |
| 2014/0219824 A1 | 8/2014 | Burnette |
| 2014/0238683 A1 | 8/2014 | Korach et al. |
| 2014/0246211 A1 | 9/2014 | Guidry et al. |
| 2014/0251623 A1 | 9/2014 | Lestz et al. |
| 2014/0255214 A1 | 9/2014 | Burnette |
| 2014/0273128 A1 | 9/2014 | Coleman et al. |
| 2014/0277772 A1 | 9/2014 | Lopez et al. |
| 2014/0290768 A1 | 10/2014 | Randle et al. |
| 2014/0294603 A1 | 10/2014 | Best |
| 2014/0332199 A1 | 11/2014 | Gilstad et al. |
| 2014/0379300 A1 | 12/2014 | Devine et al. |
| 2015/0027712 A1 | 1/2015 | Vicknair |
| 2015/0038021 A1 | 2/2015 | Gilliam |
| 2015/0053426 A1 | 2/2015 | Smith |
| 2015/0068724 A1 | 3/2015 | Coli et al. |
| 2015/0068754 A1 | 3/2015 | Coli et al. |
| 2015/0075778 A1 | 3/2015 | Walters et al. |
| 2015/0078924 A1 | 3/2015 | Zhang et al. |
| 2015/0083426 A1 | 3/2015 | Lesko et al. |
| 2015/0097504 A1 | 4/2015 | Lamascus et al. |
| 2015/0114652 A1 | 4/2015 | Lestz et al. |
| 2015/0136043 A1 | 5/2015 | Shaaban |
| 2015/0144336 A1 | 5/2015 | Hardin et al. |
| 2015/0147194 A1 | 5/2015 | Foote |
| 2015/0159911 A1 | 6/2015 | Holt |
| 2015/0175013 A1 | 6/2015 | Cryer et al. |
| 2015/0176386 A1 | 6/2015 | Castillo et al. |
| 2015/0211512 A1 | 7/2015 | Wiegman et al. |
| 2015/0211524 A1 | 7/2015 | Broussard et al. |
| 2015/0217672 A1 | 8/2015 | Shampine et al. |
| 2015/0225113 A1 | 8/2015 | Lungu et al. |
| 2015/0233530 A1 | 8/2015 | Sandidge |
| 2015/0252661 A1 | 9/2015 | Glass |
| 2015/0300145 A1 | 10/2015 | Coli et al. |
| 2015/0300336 A1 | 10/2015 | Hernandez et al. |
| 2015/0314225 A1 | 11/2015 | Coli et al. |
| 2015/0330172 A1 | 11/2015 | Allmaras et al. |
| 2015/0354322 A1 | 12/2015 | Vicknair |
| 2016/0006311 A1 | 1/2016 | Li |
| 2016/0032703 A1 | 2/2016 | Broussard et al. |
| 2016/0102537 A1 | 4/2016 | Lopez |
| 2016/0105022 A1 | 4/2016 | Oehring et al. |
| 2016/0160889 A1 | 6/2016 | Hoffman et al. |
| 2016/0177675 A1 | 6/2016 | Morris et al. |
| 2016/0177678 A1 | 6/2016 | Morris et al. |
| 2016/0186531 A1 | 6/2016 | Harkless et al. |
| 2016/0208592 A1 | 7/2016 | Oehring |
| 2016/0208593 A1 | 7/2016 | Coli et al. |
| 2016/0208594 A1 | 7/2016 | Coli et al. |
| 2016/0208595 A1 | 7/2016 | Tang et al. |
| 2016/0221220 A1 | 8/2016 | Paige |
| 2016/0230524 A1 | 8/2016 | Dumoit et al. |
| 2016/0230525 A1 | 8/2016 | Lestz et al. |
| 2016/0230660 A1 | 8/2016 | Zeitoun et al. |
| 2016/0258267 A1* | 9/2016 | Payne .................. E21B 21/062 |
| 2016/0265457 A1 | 9/2016 | Stephenson et al. |
| 2016/0273328 A1 | 9/2016 | Oehring |
| 2016/0273456 A1 | 9/2016 | Zhang et al. |
| 2016/0281484 A1 | 9/2016 | Lestz et al. |
| 2016/0290114 A1 | 10/2016 | Oehring et al. |
| 2016/0290563 A1 | 10/2016 | Diggins |
| 2016/0312108 A1 | 10/2016 | Lestz et al. |
| 2016/0319649 A1 | 11/2016 | Oehring |
| 2016/0319650 A1 | 11/2016 | Oehring et al. |
| 2016/0326853 A1 | 11/2016 | Fredd et al. |
| 2016/0326854 A1 | 11/2016 | Broussard et al. |
| 2016/0326855 A1 | 11/2016 | Coli et al. |
| 2016/0341281 A1 | 11/2016 | Brunvold et al. |
| 2016/0348479 A1 | 12/2016 | Oehring et al. |
| 2016/0349728 A1 | 12/2016 | Oehring et al. |
| 2016/0369609 A1 | 12/2016 | Morris et al. |
| 2017/0016433 A1 | 1/2017 | Chong |
| 2017/0021318 A1 | 1/2017 | McIver et al. |
| 2017/0022788 A1 | 1/2017 | Oehring et al. |
| 2017/0022807 A1 | 1/2017 | Dursun et al. |
| 2017/0028368 A1 | 2/2017 | Oehring et al. |
| 2017/0030177 A1 | 2/2017 | Oehring et al. |
| 2017/0030178 A1 | 2/2017 | Oehring et al. |
| 2017/0036178 A1 | 2/2017 | Coli et al. |
| 2017/0036872 A1 | 2/2017 | Wallace et al. |
| 2017/0037717 A1 | 2/2017 | Oehring et al. |
| 2017/0037718 A1 | 2/2017 | Coli et al. |
| 2017/0043280 A1 | 2/2017 | Vankouwenberg |
| 2017/0051732 A1 | 2/2017 | Hemandez et al. |
| 2017/0074076 A1 | 3/2017 | Joseph et al. |
| 2017/0082033 A1 | 3/2017 | Wu et al. |
| 2017/0096885 A1 | 4/2017 | Oehring et al. |
| 2017/0096889 A1 | 4/2017 | Blanckaert et al. |
| 2017/0104389 A1 | 4/2017 | Morris et al. |
| 2017/0114625 A1 | 4/2017 | Norris et al. |
| 2017/0130743 A1 | 5/2017 | Anderson |
| 2017/0138171 A1 | 5/2017 | Richards et al. |
| 2017/0145918 A1 | 5/2017 | Oehring et al. |
| 2017/0146189 A1 | 5/2017 | Herman |
| 2017/0159570 A1 | 6/2017 | Bickert |
| 2017/0159654 A1 | 6/2017 | Kendrick |

(56) References Cited

U.S. PATENT DOCUMENTS

| | | |
|---|---|---|
| 2017/0175516 A1 | 6/2017 | Eslinger |
| 2017/0204852 A1 | 7/2017 | Barnett, Jr. |
| 2017/0212535 A1 | 7/2017 | Shelman et al. |
| 2017/0218727 A1 | 8/2017 | Oehring |
| 2017/0218843 A1 | 8/2017 | Oehring et al. |
| 2017/0222409 A1 | 8/2017 | Oehring et al. |
| 2017/0226838 A1 | 8/2017 | Ciezobka et al. |
| 2017/0226839 A1 | 8/2017 | Broussard et al. |
| 2017/0226842 A1 | 8/2017 | Omont et al. |
| 2017/0234250 A1 | 8/2017 | Janik |
| 2017/0241221 A1 | 8/2017 | Seshadri et al. |
| 2017/0259227 A1 | 9/2017 | Morris et al. |
| 2017/0292513 A1 | 10/2017 | Haddad et al. |
| 2017/0313499 A1 | 11/2017 | Hughes et al. |
| 2017/0314380 A1 | 11/2017 | Oehring et al. |
| 2017/0314979 A1 | 11/2017 | Ye |
| 2017/0328179 A1 | 11/2017 | Dykstra et al. |
| 2017/0369258 A1 | 12/2017 | DeGaray et al. |
| 2017/0370639 A1 | 12/2017 | Bardon et al. |
| 2018/0028992 A1 | 2/2018 | Stegemoeller et al. |
| 2018/0038216 A1 | 2/2018 | Zhang et al. |
| 2018/0045331 A1 | 2/2018 | Lopez |
| 2018/0090914 A1 | 3/2018 | Johnson et al. |
| 2018/0156210 A1 | 6/2018 | Oehring et al. |
| 2018/0181830 A1 | 6/2018 | Luharuka et al. |
| 2018/0183219 A1 | 6/2018 | Oehring et al. |
| 2018/0216455 A1 | 8/2018 | Andreychuk |
| 2018/0238147 A1 | 8/2018 | Shahri |
| 2018/0245428 A1 | 8/2018 | Richards |
| 2018/0245568 A1 | 8/2018 | Pedersen et al. |
| 2018/0259746 A1 | 9/2018 | Broussard et al. |
| 2018/0259080 A1 | 9/2018 | Dale et al. |
| 2018/0266217 A1 | 9/2018 | Funkhauser et al. |
| 2018/0266412 A1 | 9/2018 | Stokkevag |
| 2018/0274446 A1 | 9/2018 | Oehring et al. |
| 2018/0284817 A1 | 10/2018 | Cook et al. |
| 2018/0291713 A1 | 10/2018 | Jeanson |
| 2018/0298731 A1 | 10/2018 | Bishop |
| 2018/0312738 A1 | 11/2018 | Rutsch et al. |
| 2018/0313677 A1 | 11/2018 | Warren et al. |
| 2018/0320483 A1 | 11/2018 | Zhang et al. |
| 2018/0343125 A1 | 11/2018 | Clish |
| 2018/0363437 A1 | 12/2018 | Coli |
| 2018/0363640 A1 | 12/2018 | Kajita et al. |
| 2018/0366950 A1 | 12/2018 | Pedersen et al. |
| 2019/0003329 A1 | 1/2019 | Morris et al. |
| 2019/0010793 A1 | 1/2019 | Hinderliter |
| 2019/0011066 A1 | 1/2019 | Ungchusri et al. |
| 2019/0040727 A1 | 2/2019 | Oehring et al. |
| 2019/0055827 A1 | 2/2019 | Coli et al. |
| 2019/0063309 A1 | 2/2019 | Davis |
| 2019/0100989 A1 | 4/2019 | Stewart |
| 2019/0112910 A1 | 4/2019 | Oehring et al. |
| 2019/0119096 A1 | 4/2019 | Haile |
| 2019/0120024 A1 | 4/2019 | Oehring et al. |
| 2019/0128080 A1 | 5/2019 | Ross |
| 2019/0128104 A1 | 5/2019 | Graham et al. |
| 2019/0145251 A1 | 5/2019 | Johnson |
| 2019/0154020 A1 | 5/2019 | Glass |
| 2019/0162061 A1 | 5/2019 | Stephenson |
| 2019/0169971 A1 | 6/2019 | Oehring |
| 2019/0178057 A1 | 6/2019 | Hunter |
| 2019/0178235 A1 | 6/2019 | Coskrey |
| 2019/0203567 A1 | 7/2019 | Ross |
| 2019/0203572 A1 | 7/2019 | Morris |
| 2019/0211661 A1 | 7/2019 | Reckels |
| 2019/0226317 A1 | 7/2019 | Payne et al. |
| 2019/0245348 A1 | 8/2019 | Hinderliter |
| 2019/0249527 A1 | 8/2019 | Kraynek |
| 2019/0257462 A1 | 8/2019 | Rogers |
| 2019/0292866 A1 | 9/2019 | Ross |
| 2019/0292891 A1 | 9/2019 | Kajaria |
| 2019/0383123 A1 | 12/2019 | Hinderliter |
| 2020/0040878 A1 | 2/2020 | Morris |
| 2020/0047141 A1 | 2/2020 | Oehring et al. |
| 2020/0088152 A1 | 3/2020 | Allion et al. |
| 2020/0194976 A1 | 6/2020 | Benussi |
| 2020/0232454 A1 | 7/2020 | Chretien |
| 2020/0325760 A1 | 10/2020 | Markham |
| 2020/0350790 A1 | 11/2020 | Luft et al. |
| 2021/0032961 A1 | 2/2021 | Hinderliter et al. |
| 2021/0131248 A1 | 5/2021 | Hinderliter et al. |

FOREIGN PATENT DOCUMENTS

| | | |
|---|---|---|
| CA | 2406801 | 11/2001 |
| CA | 2653069 A1 | 12/2007 |
| CA | 2707269 | 12/2010 |
| CA | 2482943 | 5/2011 |
| CA | 3050131 | 11/2011 |
| CA | 2773843 A1 | 10/2012 |
| CA | 2845347 A1 | 10/2012 |
| CA | 2955706 A1 | 10/2012 |
| CA | 2966672 A | 10/2012 |
| CA | 3000322 | 4/2013 |
| CA | 2787814 | 2/2014 |
| CA | 2833711 A1 | 5/2014 |
| CA | 2978706 | 9/2016 |
| CA | 2944980 | 2/2017 |
| CA | 3006422 | 6/2017 |
| CA | 3018485 | 8/2017 |
| CA | 2964593 A1 | 10/2017 |
| CA | 2849825 | 7/2018 |
| CA | 3067854 A1 | 1/2019 |
| CA | 2919649 | 2/2019 |
| CA | 2919666 | 7/2019 |
| CA | 2797081 | 9/2019 |
| CA | 2945579 | 10/2019 |
| CN | 101639059 A | 2/2010 |
| CN | 101977016 A | 2/2011 |
| CN | 201730812 U | 2/2011 |
| CN | 201819992 U | 5/2011 |
| CN | 201925157 U | 8/2011 |
| CN | 202157824 U | 3/2012 |
| CN | 202406331 U | 8/2012 |
| CN | 202463670 U | 10/2012 |
| CN | 202500735 U | 10/2012 |
| CN | 202545207 U | 11/2012 |
| CN | 103095209 A | 5/2013 |
| CN | 104117308 A | 10/2014 |
| CN | 102758604 A | 12/2014 |
| CN | 104196613 A | 12/2014 |
| CN | 205986303 U | 2/2017 |
| CN | 108049999 A | 5/2018 |
| CN | 112196508 A | 1/2021 |
| EP | 3453827 A2 | 3/2019 |
| EP | 3456915 A1 | 3/2019 |
| JP | 2004264589 A | 9/2004 |
| JP | 3626363 B2 | 3/2005 |
| JP | 2008263774 A | 10/2008 |
| JP | 2012117371 B2 | 6/2012 |
| KR | 20100028462 A | 3/2010 |
| RU | 48205 U1 | 9/2005 |
| RU | 98493 U1 | 10/2010 |
| RU | 2421605 C1 | 6/2011 |
| WO | 9320328 A1 | 10/1993 |
| WO | 9853182 A1 | 11/1998 |
| WO | 0047893 A1 | 8/2000 |
| WO | 2007055587 A1 | 5/2007 |
| WO | 2008136883 A1 | 11/2008 |
| WO | 2009023042 A1 | 2/2009 |
| WO | 2009046280 A1 | 4/2009 |
| WO | 2011127305 A1 | 10/2011 |
| WO | 2012051705 A1 | 4/2012 |
| WO | 2012122636 A1 | 9/2012 |
| WO | 2012137068 A1 | 10/2012 |
| WO | 201411676 A1 | 7/2014 |
| WO | 2014105642 A1 | 7/2014 |
| WO | 2014116761 | 7/2014 |
| WO | 2014177346 A1 | 11/2014 |
| WO | 2016144939 A1 | 9/2016 |
| WO | 2016160458 A1 | 10/2016 |

(56) References Cited

FOREIGN PATENT DOCUMENTS

| | | |
|---|---|---|
| WO | 2018044307 A1 | 3/2018 |
| WO | 2018213925 A1 | 11/2018 |
| WO | 2019210417 A1 | 11/2019 |

OTHER PUBLICATIONS

Davis, "Natural Gas Finding Niche in E-Fracking, But Diesel Still Rules," Natural Gas Intelligence, NGI, 2019, 9 pages.
Shafto, "Growth in electric-fracking fleets stunted by tight producer budgets," S&P Global Market Intelligence, Aug. 6, 2019, 4 pages.
"Swivel Joint," Jereh, Yantal Jereh Petroleum Equipment & Technologies Co. Ltd., printed Dec. 1, 2022, 14 pages.
Camara, "Electrical Engineering Reference Manual for the Electrical and Computer PE Exam—Sixth Edition," Professional Publications, Inc., ISBN: 1-888577-56-8, 2002, 50 pages.
"Comprehensive Power, Power It Up," Technical Presentation, Feb. 27, 2013 (available at: https://www.slideshare.net/jeffsable/comprehensive-power-introduction-oct2013?from_action=save), 28 pages.
"Comprehensive Power, Power It Up," Technical Presentation, Oct. 3, 2013 (available at: https://www.slideshare.net/jeffsable/comprehensive-power-introduction-oct2013?from_action=save), 26 pages.
"American National Standard—Motors and Generators," ANSI/NEMA MG 1, 2011, 636 pages.
"IEEE Standard for Petroleum and Chemical Industry—Premium-Efficiency, Severe-Duty, Totally Enclosed Fan-Cooled (TEFC) Squirrel Cage Induction Motors—Up to and Including 370 kW (500 hp)," IEEE, 2009, 32 pages.
Cary et al., "Electric Rotating Machine Standards Part II: Magnetic Wedge Design & Monitoring Methods," IEEE, Paper No. PCIC-2011-41, 2011, 8 pages.
Bogh et al., "A User's Guide to Factory Testing of Large Motors: What Should Your Witness Expect?," IEEE, Paper No. PCIC-, 2009, 8 pages.
Lockley et al., "What Do the API Motor/Generator Features Cost and What Do They Buy You?," IEEE, Paper No. PCIC-2010-22, 2010, 10 pages.
Malinowski et al., "Petrochemical standards a comparison between IEEE 841-2001, API 541 and API 547," IEEE, Paper No. PCIC-2004-22, 2004, 8 pages.
"Reinventing the Frac Fleet," Clean Fleet, WhisperFrac Reducing Noise and Vibrations, 2018, 2 pages.
"MEC's Mobile Electric Centers for Voltages up to 36kV," ABB, printed 2021, 2 pages.
"Prefabricated Electric Centers (PEC)—Mobile Electric Centers (MEC)," ABB, 2017, 14 pages.
"Mobile Substations on wheels," ABB, 2022, 4 pages.
"Benefits of Using Mobile Transformers and Mobile Substations for Rapidly Restoring Electrical Service," U.S. Department of Energy, Aug. 2006, 48 pages.
"The Evolution of the Modern Substation," Primera, 2022, 4 pages.
Hanna et al., "Medium-Voltage Adjustable-Speed Drives —Users' and Manufacturers' Experiences," IEEE Transactions on Industry Applications, vol. 33, No. 6, Nov./Dec. 1997, 9 pages.
"IEEE 100: The Authoritative Dictionary of IEEE Standards Terms, Seventh Edition," IEEE Press, 2000, ISBN: 0-7381-2601-2, 7 pages.
"Adjustable Speed Electrical Power Drive Systems—Part 4: General Requirements—Rating Specifications for A.C. Power Drive Systems Above 1000 V A.C. and Not Exceeding 35 KV," National Electrical Manufacturers Association (NEMA) Standards Publication ICS 61800-4, 2004, 139 pages.
Roe, "Practices and Procedures of Industrial Electrical Design," McGraw-Hill, 1972, ISBN: 0-07-053390-3, 17 pages.
Oehring et al., U.S. Appl. No. 62/242,173, 2015, 17 pages.
Samsung All-In-One Security System, Quick Start Guide Kit Model SDHC5100, printed 2022, 11 pages.
Amazon.com listing for Samsung SDH-C5100 16 Channel 720p HD DVR Video Security System, 2015, 2 pages.
Amazon.com listing for Amcrest ProHD Wireless IP Security Camera, 2015, 8 pages.
Amazon.com listing for Security & Surveillance Cameras, 2015, 6 pages.
Stewart, "Extracting the Digit!! Time for an ROV Electronics Shake-Up?," Kongsberg Simrad Ltd, UTI, 1997, 10 pages.
Martin et al., "Lessons Learned from 27 Years' Experience of Stimulation Vessel Design and Operation—a Case Study," SPE 166243, 2013, 12 pages.
Maddox, "Visualizing Production in Flowing Oil Wells," Halliburton Energy Services, SPWLA 37th Annual Logging Symposium, Jun. 16-19, 1996, 6 pages.
Cooper et al., "The First Purpose-Built Stimulation Vessel for North Sea Application," Dowell Schlumberger, Society of Petroleum Engineers of AIME, SPE 12993, 1984, 7 pages.
Talley, "Development of a Closed Circuit TV Borehole Probe," Design Engineering Laboratories, Inc., Contract H0308041, Sep. 1984, 22 pages.
Smith et al., "Fracture Width-Design vs. Measurement," Amoco Production Co., Society of Petroleum Engineers of AIME, SPE 10965, 1982, 9 pages.
Hurst et al., "Development and Application of 'Frac' Treatments in the Permian Basin," SPE 405-G, vol. 204, 1955, 8 pages.
Briggs, "Development of a Downhole Television Camera," Oceanographic Engineering Corporation, 1964, 1 page.
IPIECA About US page, 2015, 1 page.
Appl et al., "A Viewing Lens for High Pressure Applications," Society of Petroleum Engineers of AIME, SPE-299, 1962, 7 pages.
Taylor, "Efficiency: Watchword of the Oil Industry," Financial Analysts Journal, 2018, 4 pages.
Pritchard, "U.S. Color Television Fundamentals: A Review," SMPTE Journal, Nov. 1977, vol. 86, 10 pages.
Moxastore website, listing for NPORTIA5250, 2015, 2 pages.
Moxastore website, About US, 2015, 1 page.
Moxastore website, Homepage, 2015, 2 pages.
Moxastore website, listing for Moxa 802.11 Ethernet to Serial, 2016, 1 page.
Amazon.com listing for Global Cache iTach, IP to Serial with PoE (IP2SL-P) by Global Cach, 2014, 3 pages.
Amazon.com listing for SainSmart TCP/IP Ethernet to Serial RS232 RS485 Intelligent Communication Converter by SainSmart, 2014, 4 pages.
Amazon.com listing for TCP/IP Ethernet to Serial RS232 RS485 RS422 Converter by Atc, 2014, 2 pages.
Amazon.com listing for StarTech.com 1 Port RS232 Serial to IP Ethernet Converter (NETRS2321P) by StarTech, 2014, 4 pages.
Amazon.com listing for StarTech NETRS2321E 1 Port RS-232/422/485 Serial over IP Ethernet Device Server by StarTech, 2014, 4 pages.
OSHA-NIOSH Hazard Alert: Worker Exposure to Silica during Hydraulic Fracturing, U.S. Department of Labor, 2012, 15 pages.
Avallone et al., "Marks Standard Handbook for Mechanical Engineers 11th Edition," McGraw-Hill, 2007, 5 pages.
Fink, "Standard Handbook for Electrical Engineers," Thirteenth Edition, McGraw-Hill, ISBN: 0-07-020984-7, 7 pages (excerpts) (Part 1).
Mistry et al., "Induction Motor Vibrations in View of the API 541-4th edition," IEEE, Paper No. PCIC-, 2008, 10 pages.
Paschall et al., "Navigating the Test Requirements of API 541 4th Edition," IEEE, Paper No. PCIC-2007-11, 2007, 12 pages.
"G7 Adjustable Speed Drive Operation Manual," Toshiba, Document No. 51546-009, Mar. 2005, 221 pages.
"Weir SPM: General Catalog," Weir SPM, 2009, 40 pages.
Krueger, "Advances in Well Completion and Stimulation During JPT's First Quarter Century," Journal of Petroleum Technology, Dec. 1973, pp. 16.
Lietard et al., "Hydraulic Fracturing of Horizontal Wells: An Update of Design and Execution Guidelines," Society of Petroleum Engineers, SPE 37122, 1996, 15 pages.

(56) References Cited

OTHER PUBLICATIONS

Waters et al., "Simultaneous Hydraulic Fracturing of Adjacent Horizontal Wells in the Woodford Shale," Society of Petroleum Engineers, SPE 119635, 2009, 22 pages.
Bahadori et al., "Dictionary of Oil, Gas, and Petrochemical Processing," CRC Press, ISBN: 978-1-4665-8825-7, 2014, 8 pages.
"A Dictionary for the Oil and Gas Company—Second Edition," The University of Texas at Austin—Petroleum Extension Service, ISBN: 978-0-88698-240-9, 2011, 7 pages.
"Lessons Learned from Natural Gas STAR Partners: Reduced Emissions Completions for Hydraulically Fractured Natural Gas Wells," U.S. Environmental Protection Agency, 2011, 12 pages.
Kidnay et al., "Fundamentals of Natural Gas Processing—Second Edition," CRS Press, ISBN: 978-1-4200-8519-8, 2011, 19 pages (Part 1).
Kidnay et al., "Fundamentals of Natural Gas Processing—Second Edition," CRS Press, ISBN: 978-1-4200-8519-8, 2011, 17 pages (Part 2).
Kidnay et al., "Fundamentals of Natural Gas Processing—Second Edition," CRS Press, ISBN: 978-1-4200-8519-8, 2011, 12 pages (Part 3).
Listing at Amazon.com for Kidnay et al., "Fundamentals of Natural Gas Processing—Second Edition," CRS Press, ISBN: 978-1-4200-8519-8, Jul. 7, 2013, 4 pages.
Listing at Amazon.com for Kidnay et al., "Fundamentals of Natural Gas Processing—Second Edition," CRS Press, ISBN: 978-1-4200-8519-8, Feb. 22, 2015, 4 pages.
"Green Completions," IPIECA, Jan. 20, 2015, 7 pages.
"Sand Trap FAQ," Mountain Equipment of New Mexico, Inc., Jan. 8, 2014, 2 pages.
"Test Separators FAQ," Mountain Equipment of New Mexico, Inc., Jan. 8, 2014, 2 pages.
"Emergency Power Systems for Critical Facilities: A Best Practices Approach to Improving Reliability," FEMA, FEMA P-1019. Sep. 2014, 170 pages.
Persily et al., "Indoor Environmental Issues in Disaster Resilience," NIST Technical Note 1882, Jul. 2015, 40 pages.
"Precision Heat and Control Systems for Onshore Drilling and Production," Chromalox Precision Heat and Control, 2011, 6 pages.
"Zeus Electric Pumping Unit," Halliburton, printed 2021, 4 pages.
Nayyar, "Piping Handbook—Seventh Edition," Piping Handbook, 1999, 77 pages.
"Wire Rope Isolator Technologies," ITT Enidine, Inc., Mar. 29, 2014, Enidine, 78 pages.
Gardner Denver, Well Servicing Pump, Model GD-2500Q, GD-2500Q-HD, Quintuplex Pumps, Super GWS Fluid End (Uni-Flange) Parts List, 310FWF997 Revision A, Sep. 2011, 45 pages.
Wachel et al., "Analysis of Vibration and Failure Problems in Reciprocating Triplex Pumps for Oil Pipelines," The American Society of Mechanical Engineers, 1985, 8 pages.
"Flowline Products and Services—World Proven Chiksan and Weco Equipment," FMC Technologies, Mar. 28, 2015, 31 pages (Part 1).
"Flowline Products and Services—World Proven Chiksan and Weco Equipment," FMC Technologies, Mar. 28, 2015, 49 pages (Part 2).
"A complete line of swivel joints for drilling, production, and well servicing," Chiksan Original Swivel Joints, Nov. 1996, 16 pages.
"Worlds Best Swivel Joints," FlowValve, Jan. 17, 2015, available at https://web.archive.org/web/20150117041757/http://www.flowvalve.com/swivels, 10 pages.
"Victulic Couplings—Vibration Attenuation Characteristics," Victaulic Company, Oct. 2014, 5 pages.
Hudson et al., "Modeling Victaulic Couplings in Piping Stress Analysis Programs," Victaulic Company, WP-18 6685 Rev. B, Mar. 19, 2013, 19 pages.
"AGS Flexible Coupling Style W77," Victaulic, Apr. 23, 2015, available at: https://web.archive.org/web/20150423052817/http://www.victaulic.com/en/products-services/products/style-w77-ags-flexible-coupling/, 1 page.
"Advanced Groove System (AGS) Large Diameter Solutions." Victaulic, Apr. 19, 2015, available at: https://web.archive.org/web/20150419063052/http:/www.victaulic.com/en/businesses-solutions/solutions/advanced-groove-system/, 2 pages.
"Accommodating Seismic Movement," Victaulic, Apr. 12, 2015, available at https://web.archive.org/web/20150412042941/http:/www.victaulic.com/en/businesses-solutions/solutions/accommodating-seismic-movement/, 2 pages.
Saville, "The Victaulic Pipe Joint," Journal (American Water Works Association), Nov. 1922, vol. 9, No. 6, 8 pages.
Balaji et al., "Wire rope isolators for vibration isolation of equipment and structures," IP Conference Series: Materials Science and Engineering, 2015, 12 pages.
"FlowGuard Products," CoorsTek, Sep. 15, 2014 available at: https://web.archive.org/web/20140915230538/http://coorstek.com/resource-library/library/8510-1747-FlowGuard-Pulsation-Dampers.pdf, 8 pages.
"FlowGuard Pulsation Dampeners," CoorsTek, Feb. 23, 2015, available at: https://web.archive.org/web/20150223101630/http://www.coorstek.com/markets/energy_equipment/oil-gas/flowguard.php, 2 pages.
Morton, "Unlocking the Earth: A Short History of Hydraulic Fracturing," GEO ExPro, vol. 10, No. 6, Dec. 2013, 5 pages.
"Welcome to STAUFF," STAUFF, Aug. 5, 2013, 1 page.
"STAUFF Clamps," STAUFF, Aug. 7, 2013, 3 pages.
"STAUFF Clamps, Heavy Series (DIN 3015-2)," STAUFF, Aug. 30, 2013, 1 page.
"Heavy Series (DIN 3015-2)", STAUFF, Product Literature, Nov. 3, 2013, 1 page.
"Heavy Series DIN 3015, Part 2," STAUFF, Nov. 5, 2013, 24 pages.
Harris et al., "Harris' Shock and Vibration Handbook—Fifth Edition," McGraw-Hill Handbooks, 2002 [excerpted], 22 pages.
"Mark's Standard Handbook for Mechanical Engineers, 11th Edition," McGraw-Hill, ISBN 0-07-142867-4, 2007 [excerpted], 1 page.
Mallik et al., "On the Modelling of Non-Linear Elastomeric Vibration Isolators," Journal of Sound and Vibration, 1999, 219(2), 15 pages.
Malcius, "Mathematical model evaluation and parameter identification of pipe holder element," Journal of Vibroengineering, Jun. 2013, vol. 15, Issue 2, ISSN 1392-8716, 9 pages.
Wachel et al., "Piping Vibration Analysis," Engineering Dynamics, Incorporated, Proceedings of the Nineteenth Turbomachinery Symposium, 1990, 16 pages.
Non-Final Office Action issued in corresponding U.S. Appl. No. 17/060,647, dated Sep. 20, 2021.
Non-Final Office Action issued in corresponding U.S. Appl. No. 16/901,774, dated Sep. 14, 2021.
Canadian Office Action issued in Canadian Application No. 3,094,768, dated Mar. 2, 2018.
Notice of Allowance issued in corresponding U.S. Appl. No. 18/097,574, dated Jul. 12, 2023.
Notice of Allowance issued in corresponding U.S. Appl. No. 18/097,574, dated Aug. 2, 2023.
Notice of Allowance issued in corresponding U.S. Appl. No. 17/533,183, dated Sep. 21, 2022.
Notice of Allowance issued in corresponding U.S. Appl. No. 15/829,419, dated Oct. 14, 2021.
Restriction Requirement issued in corresponding U.S. Appl. No. 15/829,419, dated Apr. 2, 2020.
Non-Final Office Action issued in corresponding U.S. Appl. No. 15/829,419, dated Dec. 24, 2020.
International Search Report and Written Opinion issued in PCT Application No. PCT/US2022/030821, dated Aug. 28, 2022.
Non-Final Office Action issued in corresponding U.S. Appl. No. 17/152,135, dated Jul. 22, 2022.
Final Office Action issued in corresponding U.S. Appl. No. 17/152,135, dated Nov. 21, 2022.
Notice of Allowance issued in corresponding U.S. Appl. No. 17/152,135, dated Mar. 30, 2023.
Non-Final Office Action issued in corresponding U.S. Appl. No. 17/379,341, dated Sep. 29, 2022.
Notice of Allowance issued in corresponding U.S. Appl. No. 17/379,341, dated Feb. 1, 2023.

(56) References Cited

OTHER PUBLICATIONS

International Search Report and Written Opinion issued in PCT Application No. PCT/US2020/023912, dated Jun. 23, 2020.
Notice of Allowance issued in corresponding U.S. Appl. No. 16/871,928, dated Apr. 28, 2022.
Notice of Allowance issued in corresponding U.S. Appl. No. 16/210,749, dated Apr. 1, 2020.
Response to Non-Final Office Action dated Aug. 3, 2015 in related U.S. Appl. No. 13/679,689, 62 pages.
King, "Hydraulic Fracturing 101: What Every Representative, Environmentalist, Regulator, Reporter, Investor, University Researcher, Neighbor and Engineer Should Know About Estimating Frac Risk and Improving Frac Performance in Unconventional Gas and Oil Wells," Feb. 6-8, 2012, Society of Petroleum Engineers, 80 pages.
Gardner Denver Pumps, GD2500Q Quintuplex Pump, Oct. 14, 2019, http://www.gardnerdenver.com/en-us/pumps/quintuplex-pump-gd-2500q#menu, 7 pages.
ABB, ABB drives in power generation: medium voltage drives for more efficient and reliable plant operation, 2006, 12 pages.
ABB, ABB drives in chemical, oil and gas Medium voltage drives for greater profitability and performance, 2011, 16 pages.
ABB, Drive PC Tools: Startup and maintenance, DriveWindow Light, 2014, 2 pages.
ABB, Global Center of Excellence DC Drives: DriveWindow light upgrade for DC drives Used for DWL 2.95 and DC DriveAP, Dec. 4, 2018, 1 page.
ABB, ABB Drive Ware User's Manual, DriveWindow 2, Dec. 31, 2012, 604 pages.
ABB, ABB Drive Ware User's Guide, DriveWindow Light 2, Oct. 15, 2013, 45 pages.
Non-Final Office Action issued in corresponding U.S. Appl. No. 16/597,008, dated Dec. 23, 2019.
Notice of Allowance issued in corresponding U.S. Appl. No. 16/597,008, dated Oct. 7, 2020.
Notice of Allowance issued in corresponding U.S. Appl. No. 16/597,008, dated Dec. 4, 2020.
Non-Final Office Action issued in corresponding U.S. Appl. No. 17/170,128, dated May 24, 2022.
Notice of Allowance issued in corresponding U.S. Appl. No. 17/170,128, dated Oct. 17, 2022.
Non-Final Office Action issued in corresponding U.S. Appl. No. 16/873,583, dated Dec. 22, 2022.
Notice of Allowance issued in corresponding U.S. Appl. No. 16/873,583, dated Mar. 27, 2023.
Borets, "Borets Oil Equipment," Sep. 4, 2020, 158 pages.
Nunn, "The feasibility of natural gas as a fuel source for modern land-based drilling," Dec. 2011, 94 pages.
Saidur, "Applications of variable speed drive (VSD) in electrical motors energy savings," 2012, vol. 16, pp. 543-550.
Discenzo, "Next Generation Pump Systems Enable New Opportunities for Asset Management and Economic Optimization,"Sep. 4, 2020, 8 pages.
Nikolich, "Compressors, pumps, refrigeration equipment: improvement and specialization of piston pumps for oil and gas well-drilling and production operations," 1996, Chemical and Petroleum Engineering, vol. 32, pp. 157-162.
Finger, "Sandia National Handbook Laboratories Report: Slimhole handbook: procedures and recommendations for slimhole drilling and testing in geothermal exploration," Oct. 1999, 164 pages.
Besore, MTU Detroit Diesel Inc., "How to select generator sets for today's oil and gas drill rigs: careful comparison and selection can improve performance and reduce costs," May 5, 2010, 4 pages, https://www.mtu-online.com/fileadmin/fm-dam/mtu-usa/mtuinnorthamerica/white-papers/WhitePaper_EDP.pdf.
Pemberton, "Strategies for Optimizing pump efficiency and LCC performance: process pumps are the largest consumers of energy in a typical pulp and paper mill—boosting their efficiency is a new avenue to reduced plant operating costs," Jun. 2003, Paper Age, pp. 28-32.
Thompson, "Optimizing the production system using real-time measurements: a piece of the digital oilfield puzzle," Nov. 11-14, 2007, SPE Annual Technical Conference and Exhibition, pp. 1-10.
Guffey, "Field testing of variable-speed beam-pump computer control," May 1991, SPE Production Engineering, pp. 155-160.
Irvine, "The use of variable frequency drives as a final control in the petroleum industry," 2000, IEEE, pp. 2749-2758.
Ikeda et al., "Hydraulic fracturing technique: pore pressure effect and stress heterogeneity," 1989, Int. J. Rock Mech. Min. Sci. & Geomech., vol. 26, No. 6, pp. 471-475.
Coli Patent Application, "Mobile, modular, electrically powered system for use in fracturing underground formations," filed Apr. 7, 2011, 28 pages.
Gardner Denver—Well Servicing Pump Model GD-2500Q, GD-2500Q-HD, Quintuplex Pumps, GWS Fluid End Parts List, Jul. 2011, 39 pages.
Gardner Denver GD-2500Q Well Service Pump, 2 pages.
Gardner Denver C-2500 Quintuplex Well Service Pump, 2013, 2 pages.
Toshiba 2011 Industrial Catalog, Drives, PAC, PLCs, 2011, 272 pages.
Gardner Denver GD-2500 Quintuplex Well Service Pump, 2003, 2 pages.
Loewenthal, Design of Power-Transmitting Shafts, NASA Reference Publication 1123, Jul. 1984, 30 pages.
Gardner Denver GD-2500Q Quintuplex Well Service Pump Power End Parts List, Apr. 2007, 15 pages.
Toshiba H9 ASD Installation and Operation Manual, Mar. 2011, 287 pages.
Offshore Technology Conference, Houston, TX, Apr. 30-May 3, 2012, Honghua Group Brochure and Pictures, 6 pages.
Honghua Group Customer Spreadsheet, 2 pages.
Owen, "Chinese company launches new fracking rigs," May 2, 2012, Oil & Gas Technology Magazine, 2 pages.
Honghua Group Limited, Complete Equipment and System Integrating by Using of Gas Power-gen and Power Grid and VFD System, 30 pages.
Honghua Group Limited, Is gas and electricity driven equipment the future trend for develop lithologic reservoirs, 2 pages.
ABB Group, MV Drive benefits for shale gas applications, Powerpoint, Apr. 2012, 16 pages.
U.S. Well Services, Game-changing hydraulic fracturing technology, reduces emissions by 99%: U.S. Well Services's patented clean fleet technology proven to cut emission, save fuel and allow for quieter operations on site, Oct. 1, 2014, 3 pages.
ASME, Hydraulic Fracturing's Greener Tint, Jan. 11, 2018, 2 pages.
Fluid Power, Clean Fleet Reduces Emissions by 99% at Hydraulic Fracturing Sites, Jan. 11, 2005, 3 pages.
Louisiana State University, Petroleum alumnus and team develop mobile fracturing unit that alleviates environmental impact, LSU School of EE & CS, Nov. 2012, 2 pages.
Kane, Energy pipeline: US Well Services brings clean fleet to Weld County, Nov. 4, 2015, Greeley Tribute, 7 pages.
Business Wire, Hunghua Group showcases shale gas, offshore and land drilling solutions at the 2013 Offshore Technology Conference, May 6, 2013, 2 pages.
Liou, Hunghua Group introduces 6,000-hp integrated shale gas system, Drilling Matters, May 21, 2012, 2 pages.
TESS Record—Trademark for Clean Fleet registered Sep. 5, 2013, Jan. 14, 2020, 2 pages.
U.S. Well Services, About U.S. Well Services, Jan. 14, 2020, 14 pages.
Unknown, "Improving the Drilling Cycle," Oilfield Technology, Dec. 2009, vol. 2, Issue 9, 5 pages.
Unknown, "Andon (manufacturing)," last edited Sep. 8, 2019, https://en.wikipedia.org/w/index.php?title=Andon_(manufacturing)&oldid=914575778, 2 pages.
Subramaniam, "Production monitoring system for monitoring the industrial shop floor performance," 2009, International Journal of Systems Applications, Engineering & Development, vol. 3, Issue 1, pp. 28-35.

(56) References Cited

OTHER PUBLICATIONS

Unknown, Evolution Well Services advances fracturing operations with an electrically powered system, Calgary PR Newswire, Jun. 4, 2012, 2 pages.
Honghua Group, Honghua America, LLC, HHF—1600 Mud Pump, 2 pages.
Honghua Group, Honghua Shale Gas Solutions Power Point Slides, Feb. 2012, 41 pages.
Mactel, Frac Test with VFDs Final Report Hydraulic Fracturing Pilot Test Results and Preliminary Full Scale Design United Nuclear Church Rock Facility, Dec. 23, 2003, 73 pages.
Gates, ASME Hydraulic Fracturing Conference, Mar. 24, 2015, http://www.otrglobal.com/newsroom/cnotes/128720, 6 pages.
Gardner Denver Well Servicing Pump Model C2500Q Quintuplex Operating and Service Manual, Apr. 2011, 46 pages.
Coli, Mobile, modular, electrically powered system for use in fracturing underground formations using liquid petroleum gas, Oct. 5, 2012, U.S. Appl. No. 61/710,393, 59 pages.
Toshiba, G9 Brochure—G9 Series Adjustable Speed Drives, Jun. 2007, 6 pages.
Gamboa, "Variable Frequency Drives in Oil and Gas Pumping Systems," Pumps & Systems, Dec. 17, 2011, https://www.pumpsandsystems.com/variable-frequency-drives-oil-and-gas-pumping-systems, 5 pages.
Unknown, "U.S. Well Services for Antero Fracking," Oct. 3, 2014, HHP Insight, http://hhpinsight.com/epoperations/2014/10/u-s-well-services-for-antero-fracking/, 3 pages.
International Search Report and Written Opinion issued in PCT Application No. PCT/US2020/023089, dated Jun. 2, 2020.
Albone, "Mobile Compressor Stations for Natural Gas Transmission Service," ASME 67-GT-33, Turbo Expo, Power for Land, Sea and Air, vol. 79887, p. 1-10, 1967.
Canadian Office Action issued in Canadian Application No. 2,928,707, dated Sep. 8, 2020.
Canadian Office Action issued in Canadian Application No. 2,944,980, dated Aug. 31, 2020.
Canadian Office Action issued in Canadian Application No. 2,982,974, dated Sep. 22, 2020.
Final Office Action issued in corresponding U.S. Appl. No. 15/356,436, dated Mar. 31, 2020.
Final Office Action issued in corresponding U.S. Appl. No. 16/404,283, dated Jan. 11, 2021.
Final Office Action issued in corresponding U.S. Appl. No. 16/597,014, dated Feb. 4, 2021.
Goodwin, "High-voltage auxiliary switchgear for power stations," Power Engineering Journal, 1989, 10 pg. (Year 1989).
"Heat Exchanger" (https://en.wikipedia.org/w/index.php?title=Heat_exchanger&oldid=89300146) Dec. 18, 2019 Apr. 2019 (Apr. 18, 2019), entire document, especially para (0001.
International Search Report and Written Opinion issued in PCT Application No. PCT/US2020/023809, dated Jun. 2, 2020.
International Search Report and Written Opinion issued in PCT Application No. PCT/US2020/023821, dated Aug. 28, 2020.
International Search Report and Written Opinion issued in PCT Application No. PCT/US2020/036932, dated Sep. 3, 2020.
International Search Report and Written Opinion issued in PCT Application No. PCT/US2020/053980, dated Dec. 14, 2020.
International Search Report and Written Opinion issued in PCT Application No. PCT/US2020/058899, dated Feb. 3, 2021.
International Search Report and Written Opinion issued in PCT Application No. PCT/US2020/058906, dated Feb. 2, 2021.
International Search Report and Written Opinion issued in PCT Application No. PCT/US2020/059834, dated Feb. 4, 2021.
International Search Report and Written Opinion issued in PCT Application No. PCT/US2020/066543, dated May 11, 2021.
International Search Report and Written Opinion issued in PCT Application No. PCT/US2020/067146, dated Mar. 29, 2021.
International Search Report and Written Opinion issued in PCT Application No. PCT/US2020/067523, dated Mar. 22, 2021.
International Search Report and Written Opinion issued in PCT Application No. PCT/US2020/067526, dated May 6, 2021.
International Search Report and Written Opinion issued in PCT Application No. PCT/US2020/067528, dated Mar. 19, 2021.
International Search Report and Written Opinion issued in PCT Application No. PCT/US2020/067608, dated Mar. 30, 2021.
Karin, "Duel Fuel Diesel Engines," (2015). Taylor & Francis, pp. 62-63, retrieved from https://app.knovel.com/hotlink/oc/id:kpDFDE0001/dual-fuel-diesel-engines/duel-duel-diesel-engines (Year 2015).
Morris et al., U.S. Appl. No. 62/526,869; Hydration-Blender Transport and Electric Power Distribution for Fracturing Operation; Jun. 28, 2018; USPTO; see entire document.
Non-Final Office Action issued in corresponding U.S. Appl. No. 14/881,525, dated Jul. 21, 2021.
Non-Final Office Action issued in corresponding U.S. Appl. No. 14/881,535, dated Dec. 20, 2018.
Non-Final Office Action issued in corresponding U.S. Appl. No. 15/145,443, dated May 8, 2020.
Non-Final Office Action issued in corresponding U.S. Appl. No. 15/356,436, dated Oct. 26, 2020.
Non-Final Office Action issued in corresponding U.S. Appl. No. 16/167,083, dated Aug. 31, 2020.
Non-Final Office Action issued in corresponding U.S. Appl. No. 16/356,263, dated Sep. 2, 2020.
Non-Final Office Action issued in corresponding U.S. Appl. No. 16/377,861, dated Jun. 22, 2020.
Non-Final Office Action issued in corresponding U.S. Appl. No. 16/404,283, dated Jun. 29, 2020.
Non-Final Office Action issued in corresponding U.S. Appl. No. 16/443,273, dated Oct. 5, 2020.
Non-Final Office Action issued in corresponding U.S. Appl. No. 16/458,696, dated May 22, 2020.
Non-Final Office Action issued in corresponding U.S. Appl. No. 16/522,043, dated Jan. 4, 2021.
Non-Final Office Action issued in corresponding U.S. Appl. No. 16/564,185, dated Jan. 29, 2021.
Non-Final Office Action issued in corresponding U.S. Appl. No. 16/728,359, dated Jun. 29, 2021.
Non-Final Office Action issued in corresponding U.S. Appl. No. 16/871,928, dated Aug. 25, 2021.
Non-Final Office Action issued in corresponding U.S. Appl. No. 16/943,727, dated Aug. 3, 2021.
Non-Final Office Action issued in corresponding U.S. Appl. No. 16/943,727, dated Sep. 29, 2020.
Notice of Allowance issued in corresponding U.S. Appl. No. 15/829,419, dated Jul. 26, 2021.
"Process Burner" (https://www.cebasrt.com/productsloii-gaslprocess-bumer) Sep. 6, 2018 (Sep. 6, 2018), entire document, especially para (Burners for refinery Heaters.
"Water and Glycol Heating Systems" (https://www.heat-inc.com/wg-series-water-glycol-systems/) Jun. 18, 2018 (Jun. 18, 2018), entire document, especially WG Series Water Glycol Systems.
Woodbury et al., "Electric Design Considerations for Drilling Rigs," IEEE Transactions on Industry Applications, vol. 1A-12, No. 4, Jul./Aug. 1976, pp. 421-431.
Kroposki et al., "Making Microgrids Work," 6 IEEE Power and Energy Mag. 40, 41, 2008.
Ton et al., "The U.S. Department of Energy's Microgrid Initiative," 25 The Electricity J. 84, 2012, pp. 84-94.
Non-Final Office Action issued in corresponding U.S. Appl. No. 16/871,328, dated Dec. 9, 2021.
Non-Final Office Action issued in corresponding U.S. Appl. No. 16/943,935, dated Oct. 21, 2021.
Non-Final Office Action issued in corresponding U.S. Appl. No. 16/564,186, dated Oct. 15, 2021.
Final Office Action issued in corresponding U.S. Appl. No. 16/356,263, dated Oct. 7, 2021.
UK Power Networks—Transformers to Supply Heat to Tate Modern—from Press Releases May 16, 2013.
Non-Final Office Action issued in corresponding U.S. Appl. No. 15/293,681, dated Feb. 16, 2017.

(56) References Cited

OTHER PUBLICATIONS

Non-Final Office Action issued in corresponding U.S. Appl. No. 15/294,349, dated Mar. 14, 2017.
Final Office Action issued in corresponding U.S. Appl. No. 15/145,491, dated Jan. 20, 2017.
Non-Final Office Action issued in corresponding U.S. Appl. No. 15/145,443, dated Feb. 7, 2017.
Notice of Allowance issued in corresponding U.S. Appl. No. 15/217,040, dated Mar. 28, 2017.
Notice of Allowance issued in corresponding U.S. Appl. No. 14/622,532, dated Mar. 27, 2017.
Non-Final Office Action issued in corresponding U.S. Appl. No. 15/291,842, dated Jan. 6, 2017.
Final Office Action issued in corresponding U.S. Appl. No. 14/622,532, dated Dec. 7, 2016.
Non-Final Office Action issued in corresponding U.S. Appl. No. 14/622,532, dated May 17, 2016.
Final Office Action issued in corresponding U.S. Appl. No. 14/622,532, dated Dec. 21, 2015.
Non-Final Office Action issued in corresponding U.S. Appl. No. 14/622,532, dated Aug. 5, 2015.
Non-Final Office Action issued in corresponding U.S. Appl. No. 15/145,491, dated Sep. 12, 2016.
Non-Final Office Action issued in corresponding U.S. Appl. No. 15/217,040, dated Nov. 29, 2016.
Non-Final Office Action issued in corresponding U.S. Appl. No. 15/235,788, dated Dec. 14, 2016.
Non-Final Office Action issued in corresponding U.S. Appl. No. 15/145,491, dated May 15, 2017.
Non-Final Office Action issued in corresponding U.S. Appl. No. 15/486,970, dated Jun. 22, 2017.
Non-Final Office Action issued in corresponding U.S. Appl. No. 15/487,656, dated Jun. 23, 2017.
Non-Final Office Action issued in corresponding U.S. Appl. No. 15/487,694, dated Jun. 26, 201.
Final Office Action issued in corresponding U.S. Appl. No. 15/294,349, dated Jul. 6, 2017.
Non-Final Office Action issued in corresponding U.S. Appl. No. 14/884,363, dated Sep. 5, 2017.
Final Office Action issued in corresponding U.S. Appl. No. 15/145,491, dated Sep. 6, 2017.
Non-Final Office Action issued in corresponding U.S. Appl. No. 14/881,535, dated Oct. 6, 2017.
Non-Final Office Action issued in corresponding U.S. Appl. No. 15/145,414, dated Nov. 29, 2017.
Non-Final Office Action issued in corresponding U.S. Appl. No. 15/644,487, dated Nov. 13, 2017.
Canadian Office Action issued in Canadian Application No. 2,833,711, dated Mar. 2, 2018.
Non-Final Office Action issued in corresponding U.S. Appl. No. 15/294,349, dated Apr. 10, 2018.
Non-Final Office Action issued in corresponding U.S. Appl. No. 15/183,387, dated Apr. 2, 2018.
Non-Final Office Action issued in corresponding U.S. Appl. No. 15/235,716, dated May 29, 2018.
Canadian Office Action issued in Canadian Application No. 2,928,711, dated Apr. 18, 2018.
Canadian Office Action issued in Canadian Application No. 2,886,697, dated Jun. 22, 2018.
Non-Final Office Action issued in corresponding U.S. Appl. No. 15/644,487, dated Jul. 25, 2018.
Non-Final Office Action issued in corresponding U.S. Appl. No. 15/217,081, dated Oct. 4, 2018.
International Search Report and Written Opinion issued in PCT Application No. PCT/US2018/040683, dated Sep. 19, 2018.
Canadian Office Action issued in Canadian Application No. 2,945,281, dated Sep. 28, 2018.
Non-Final Office Action issued in corresponding U.S. Appl. No. 16/160,708, dated Dec. 12, 2018.
International Search Report and Written Opinion issued in PCT Application No. PCT/US2018/054542, dated Jan. 2, 2019.
International Search Report and Written Opinion issued in PCT Application No. PCT/US2018/054548, dated Jan. 2, 2019.
International Search Report and Written Opinion issued in PCT Application No. PCT/US2018/055913, dated Dec. 31, 2018.
International Search Report and Written Opinion issued in PCT Application No. PCT/US2018/057539, dated January 4. 2019.
Non-Final Office Action issued in corresponding U.S. Appl. No. 16/170,695, dated Feb. 12, 2019.
International Search Report and Written Opinion issued in PCT Application No. PCT/US2018/063977, dated Feb. 15, 2019.
International Search Report and Written Opinion issued in PCT Application No. PCT/US2018/063970, dated Mar. 5, 2019.
Non-Final Office Action issued in corresponding U.S. Appl. No. 16/210,749, dated Feb. 25, 2019.
Non-Final Office Action issued in corresponding U.S. Appl. No. 15/183,387, dated Mar. 6, 2019.
Canadian Office Action issued in Canadian Application No. 2,936,997, dated Jan. 30, 2019.
Canadian Office Action issued in Canadian Application No. 2,943,275, dated Mar. 1, 2019.
International Search Report and Written Opinion issued in PCT Application No. PCT/US2019/016635, dated Apr. 10, 2019.
Notice of Allowance issued in corresponding U.S. Appl. No. 15/635,028, dated Apr. 23, 2019.
International Search Report and Written Opinion issued in PCT Application No. PCT/US2019/027584, dated Jul. 9, 2019.
Fink, "Standard Handbook for Electrical Engineers," Thirteenth Edition, McGraw-Hill, ISBN: 0-07-020984-7, 7 pages (excerpts) (Part 2).
Fink, "Standard Handbook for Electrical Engineers," Thirteenth Edition, McGraw-Hill, ISBN: 0-07-020984-7, 6 pages (excerpts) (Part 3).
Roe, "Practices and Procedures of Industrial Electrical Design," McGraw-Hill, 1972, ISBN: 0-07-053390-3, 14 pages (Part 1).
Roe, "Practices and Procedures of Industrial Electrical Design," McGraw-Hill, 1972, ISBN: 0-07-053390-3, 11 pages (Part 2).
Camara, "Electrical Engineering Reference Manual for the Electrical and Computer PE Exam—Sixth Edition," Professional Publications, Inc., ISBN: 1-888577-56-8, 2002, 17 pages (Part 1).
Camara, "Electrical Engineering Reference Manual for the Electrical and Computer PE Exam—Sixth Edition," Professional Publications, Inc., ISBN: 1-888577-56-8, 2002, 25 pages (Part 2).
Camara, "Electrical Engineering Reference Manual for the Electrical and Computer PE Exam—Sixth Edition," Professional Publications, Inc., ISBN: 1-888577-56-8, 2002, 20 pages (Part 3).
Camara, "Electrical Engineering Reference Manual for the Electrical and Computer PE Exam—Sixth Edition," Professional Publications, Inc., ISBN: 1-888577-56-8, 2002, 19 pages (Part 4).
Camara, "Electrical Engineering Reference Manual for the Electrical and Computer PE Exam—Sixth Edition," Professional Publications, Inc., ISBN: 1-888577-56-8, 2002, 21 pages (Part 5).
PPI Course Catalog, 2004, available at: https://web.archive.org/web/20040220012405/http://ppi2pass.com/catalog/servlet/MyPpi_fl_corner-catalog.pdf, 16 pages.
"Teaching an Electrical and Computer Engineering PE Exam Review Course," PPI, 2003, available at: https://web.archive.org/web/20031223100101/http://ppi2pass.com/catalog/servlet/MyPpi_pg_corner-teachee.html, 2 pages.
"Instructors Corner," PPI, 2003, available at: https://web.archive.org/web/20031219232547/http://ppi2pass.com/catalog/servlet/MyPpi_pg_corner-corner.html, 2 pages.
EE-Reference Online Index, 2004, available at: https://web.archive.org/web/20040731020344/http://ppi2pass.com/catalog/servlet/MyPpi_fl_indices-EERMindex.pdf, 41 pages.
EE-Reference Online Introduction, 2004, available at: https://web.archive.org/web/20041013101643/http://ppi2pass.com/catalog/servlet/MyPpi_fl_indices-EERMIntro.pdf, 12 pages.
"Electrical PE Exam Review Products," PPI Online Catalog, 2004, available at: https://web.archive.org/web/20040214233851/http://ppi2pass.com/catalog/servlet/MyPpi_ct_ELECTRICAL, 7 pages.

(56) References Cited

OTHER PUBLICATIONS

"The PPI Online Catalog," 2004, available at: https://web.archive.org/web/20040215142016/http://ppi2pass.com/catalog/servlet/MyPpi_ct_MAIN, 2 pages.
Homepage of Professional Publications, Inc., 2004, available at: https://web.archive.org/web/20040209054901/http:/ppi2pass.com/catalog/servlet/MyPpi, 1 page.
"What PPI Customers Say," 2003), available at: https://web.archive.org/web/20031226130924/http://ppi2pass.com/catalog/servlet/MyPpi_pg_comments-EEcomments.html, 2 pages.
"About PPI," 2003, available at: https://web.archive.org/web/20031219231426/http://ppi2pass.com:80/catalog/servlet/MyPpi_pg_aboutppi.html, 1 page.
Amazon.com listing of EE-Reference, 2007, available at: https://web.archive.org/web/20070103124447/https://www.amazon.com/Electrical-Engineering-Reference-Manual-Computer/dp/1888577568/, 7 pages.
Hampton, "Low-cost fracking offers boon to oil producers, headaches for suppliers," Reuters, Sep. 12, 2019, https://www.reuters.com/article/us-usa-oil-electric-fracturing-focus/low-cost-fracking-offers-boon-to-oil-producers-headaches-for-supplies, 11 page.
"All Electric Fracturing—Reducing Emissions and Cost," 2021, H013770, 6 pages.
Abbott et al., "Crippling the Innovation Economy: Regulatory Overreach at the Patent Office," Regulatory Transparency Project of the Federalist Society, Aug. 14, 2017, 35 pages.
"Hydraulic Fracturing Techbook," Hartenergy, 2015, 9 pages.
"Petroleum Alumnus and Team Development Mobile Fracturing Unit that Alleviates Environmental Impact," LSU College of Engineering, 2021, 2 pages.
"Clean Fleet Reduces Emissions by 99% at Hydraulic Fracturing Sites," FluidPower Journal, 2019, 5 pages.
Deuster, "Game-changing hydraulic fracturing technology, reduces emissions by 99%," Intrado GlobeNewswire, Oct. 1, 2014, 4 pages.
"Halliburton Delivers Successful Grid-Powered Frac Operation", Halliburton News Release, Jan. 14, 2021, 4 pages.
Wang et al., "Development In The Limited—Entry Completion Fracturing Technique," SPE 17834, 1988, 13 pages.
Holden III et al., "Successful Stimulation of Fordoche Field With a Retarded HF Acid," Society of Petroleum Engineers of AIME, Aug. 1981, 6 pages.
Milligan, "Sour Gas Well Completion Practices in the Foothills," Society of Petroleum Engineers of AIME, Sep. 1982, 12 pages.
Beck et al., "Reservoir Evaluation Of Fractured Cretaceous Carbonates In South Texas," SPWLA Eighteenth Annual Logging Symposium, Jun. 5-8, 1977, 25 pages.
Webster, "Current Completion Practices in Tight Reservoirs," Society of Petroleum Engineers, SPE 6379, 1977, 8 pages.
Bielstein, "Wire-Line Methods and Equipment," Humble Oil and Refining Company, Apr. 2, 1967, 16 pages.
"Form-wound Squirrel-Cage Induction Motors—500 Horsepower and Larger," ANSI/API Standard, 541-2003, Fourth Edition, Jun. 2004, 88 pages.
Gardner Denver, "Well Servicing Pump, Model GD-2500Q, Quintuplex, Operating and Service Manual," 300FWF996 Revision C, Aug. 2005, 46 pages.
"Standard Specification for Steel Bars, Carbon and Alloy, Hot-Wrought, General Requirements for," ASTM Int;I, A 29/A 29M-05, 2005, 16 pages.
"Variable Speed Pumping: A Guide to Successful Applications," Elsevier 2004, ISBN 1-85617-449-2, 2004, 186 pages.
Bonnett et al., "Squirrel Cage Rotor Options for A.C. Induction Motors," IEEE, 2000, 14 pages.
Bonnett, "Root Cause Failure Analysis for AC Induction Motors in the Petroleum and Chemical Industry," IEEE, Paper No. PCIC-2010-43, 2010, 13 pages.
"Mark's Standard Handbook for Mechanical Engineers, 11th Edition," McGraw-Hill, ISBN 0-07-142867-4, 2006, 11 pages.
"Standard Handbook for Electrical Engineers," Thirteenth Edition, McGraw-Hill, ISBN 0-07-020984-7, 1993, 9 pages (Part 1).
"Standard Handbook for Electrical Engineers," Thirteenth Edition, McGraw-Hill, ISBN 0-07-020984-7, 1993, 7 pages (Part 2).
"Standard Handbook for Electrical Engineers," Thirteenth Edition, McGraw-Hill, ISBN 0-07-020984-7, 1993, 6 pages (Part 3).
"112 IEEE Standard Test Procedure for Polyphase Induction Motors and Generators," IEEE Power Engineering Society, IEEE Std 112, 2004, 42 pages (Part 1).
"112 IEEE Standard Test Procedure for Polyphase Induction Motors and Generators," IEEE Power Engineering Society, IEEE Std 112, 2004, 45 pages (Part 2).
Hodowanec et al., "Introduction to API Standard 541, 4th Edition—Form-Wound Squirrel Cage Induction Motors—Larger than 500 Horsepower," IEEE, Paper No. PCIC-2003-33, 2003, 9 pages.
Rahill et al., "Sorting Out the Overlap," IEEE Industry Applications Magazine, vol. 15, No. 1, Jan.-Feb. 2009, 12 pages.
"Manufacturers of Cushioned Clamping, Quick Coupling & Support Systems," ZSI Beta Clamps, ZSI, Inc., Apr. 29, 2015, 2 pages.
Meikrantz et al., "Advances in Liquid/Liquid Centrifuge Design Provide New Options for Petroleum Production," Society of Petroleum Engineers, SPE 56709, 1999, 4 pages.
Non-Final Office Action issued in U.S. Appl. No. 15/145,443 mailed May 8, 2020.
Non-Final Office Action issued in U.S. Appl. No. 16/458,696 mailed May 22, 2020.
Non-Final Office Action Mailed Aug. 31, 2020 in U.S. Appl. No. 16/167,083.
Non-Final Office Action mailed Dec. 23, 2019 in related U.S. Appl. No. 16/597,008.
Non-Final Office Action mailed Jan. 29, 2021 in US 16/564, 185.
Non-Final Office Action mailed Mar. 3, 2020 in related U.S. Appl. No. 16/152,695.
Non-Final Office Action Mailed Sep. 2, 2020 in U.S. Appl. No. 16/356,263.
Non-Final Office Action Mailed Sep. 29, 2020 in U.S. Appl. No. 16/943,727.
Non-Final Office Mailed Oct. 26, 2020 in U.S. Appl. No. 15/356,436.
Non-Final Office Mailed Oct. 5, 2020 in U.S. Appl. No. 16/443,273.
Notice of Allowance mailed Jan. 9, 2020 in related U.S. Appl. No. 16/570,331.
Nportia5250, Moxastore, http://www.moxastore.com/NPORTIA5250_p/nportia5250.htm.
Occupational Safety and Health Administration—Home, United States Department of Labor, https://web.archive.org/web/20120722160756/http://www.osha.gov/, accessed Jun. 13, 2021, 2 pages.
Office Action mailed Aug. 19, 2019 in related U.S. Appl. No. 15/356,436.
Office Action mailed Aug. 4, 2020 in related U.S. Appl. No. 16/385,070.
Office Action mailed Dec. 6, 2019 in related U.S. Appl. No. 16/564,186.
Office Action mailed Jul. 23, 2020 in related U.S. Appl. No. 16/597,014.
Office Action mailed Jun. 22, 2020 in related U.S. Appl. No. 16/377,861.
Office Action mailed Jun. 29, 2020 in related U.S. Appl. No. 16/404,283.
Office Action mailed Jun. 29, 2020 in related U.S. Appl. No. 16/728,359.
Office Action mailed Oct. 11, 2019 in related U.S. Appl. No. 16/385,070.
Office Action mailed Oct. 2, 2019 in related U.S. Appl. No. 16/152,732.
Office Action mailed Sep. 11, 2019 in related U.S. Appl. No. 16/268,030.
Office Action mailed Sep. 20, 2019 in related U.S. Appl. No. 16/443,273.
Office Action mailed Sep. 3, 2019 in related U.S. Appl. No. 15/994,772.
Onyx Industries Inc., Stack Light Engineering Reference Guide, Sep. 23, 2012, 4 pages.
OSHA Publications, U.S. Department of Labor—Occupational Safety and Health Administration, https://web.archive.org/web/

(56) References Cited

OTHER PUBLICATIONS

20150406054914/https://www.osha.gov/pls/publications/publication. AthruZ?pType=Industry, Jun. 13, 2021, 3 pages.
Portfolio Media Inc., A Shift to Sand: Spotlight on Silica Use in Fracking, Law360, https://www.law360.com/articles/366057/print?section=energy, accessed Jun. 10, 2021, 5 pages.
Professional Publications, Inc., Books for the FE, PE, FLS and PLS Exams, Spring 2004, http://www.ppi2pass.com/corner/catalog.pdf, 16 pages.
Professional Publications, Inc., Electrical Engineering Reference Manual, 12 pages.
Professional Publications, Inc., FE Exam, PE Exam, ARE Exam, and NCIDQ Exam Review/ Professional Engineering Licensing, About PPI, https://web.archive.org/web/20031219231426/http://ppi2pass.com:80/catalog/servlet/MyPpi_pg_aboutppi.html, accessed Jul. 22, 2021, 1 page.
Professional Publications, Inc., FE Exam, PE Exam, ARE Exam, and NCIDQ Exam Review/ Professional Engineering Licensing, Electrical PE Exam Review Products, https://web.archive.org/web/20040214233851/http://ppi2pass.com:80/catalog/servlet/MyPpi_ct_ELECTRICAL, accessed Jul. 19, 2021, 7 pages.
Professional Publications, Inc., FE Exam, PE Exam, ARE Exam, and NCIDQ Exam Review/ Professional Engineering Licensing, Homepage, https://web.archive.org/web/20040209054901/http://ppi2pass.com:80/catalog/servlet/MyPpi, accessed Jul. 19, 2021, 1 page.
Professional Publications, Inc., FE Exam, PE Exam, ARE Exam, and NCIDQ Exam Review/ Professional Engineering Licensing, Instructor's Corner, https://web.archive.org/web/20031219232547/http://ppi2pass.com:80/catalog/servlet/MyPpi_pg_corner-corner.html, accessed Jul. 19, 2021, 2 pages.
Professional Publications, Inc., FE Exam, PE Exam, ARE Exam, and NCIDQ Exam Review/ Professional Engineering Licensing, Teaching an Electrical and Computer Engineering PE Exam Review Course, https://web.archive.org/web/20031223100101/http://ppi2pass.com:80/catalog/servlet/MyPpi_pg_corner-teachee.html, accessed Jul. 19, 2021, 2 pages.
Professional Publications, Inc., FE Exam, PE Exam, ARE Exam, and NCIDQ Exam Review/ Professional Engineering Licensing, The PPI Online Catalog, https://web.archive.org/web/20040215142016/http://ppi2pass.com:80/catalog/servlet/MyPpi_ct_MAIN, accessed Jul. 19, 2021, 2 pages.
Professional Publications, Inc., FE Exam, PE Exam, ARE Exam, and NCIDQ Exam Review/ Professional Engineering Licensing, What PPI Customers Say, https://web.archive.org/web/20031226130924/http://ppi2pass.com:80/catalog/servlet/MyPpi_pg_comments-EEcomments.html, accessed Jul. 22, 2021, 2 pages.
Project Registration, Moxastore, http://www.moxastore.com, Feb. 15, 2015, 2 pages.
Public Catalog of the U.S. Copyright Office for search result: electrical engineering reference manual, https://cocatalog.oc.gov/cgi-bin/Pwebrecon.cgi?v1=6&ti=1, 6&Search_Arg=electrical engineering reference manual&Search_Code=TALL&CNT=25&PI. . . , accessed Jul. 21, 2021, 2 pages.
Publications, U.S. Department of Labor—Occupational Safety and Health Administration, https://web.archive.org/web/20150626140537/https:/Jwww.osha.gov/pls/publications/publication.html, 47 pages.
Pulsation Dampers, Coorstek, 2014, https://web.archive.org/web/20140919005733/http://coorstek.com/markets/energy_equip. . . , 2 pages.
R. Mistry et al., "Induction Motor Vibrations in view of the API 541—4th Edition," IEEE, accessed Jun. 10, 2021, 10 pages.
Random House Webster's Unabridged Dictionary, Second Edition, 2001, p. 990.
Ryan Davis, "Albright Says He'll Very Rarely Put Cases On Hold For PTAB," Law 360, https://www.law360.com/articles/1381597/print?section=ip, 2 pages.
Services—U.S. Well Services, http://uswellservices.com/services/, accessed Nov. 13, 2021, 10 pages.
Society of Automotive Engineers, Sae J1292: Automobile, Truck, Truck-Tractor, Trailer, and Motor Coach Wiring, 49 CFR 393.28, Oct. 1981, 6 pages.
Stan Gibilisco, The Illustrated Dictionary of Electronics: Audio/Video Consumer Electronics Wireless Technology-Eighth Edition, 2001, p. 667.
Standing Order Governing Proceedings—Patent Cases, in the United States District Court for the Western District of Texas, Waco Division, filed Nov. 17, 2021, 11 pages.
Stephen Cary et al., "Electric Rotating Machine Standards Part II: Magnetic Wedge Design & Monitoring Methods," 2011 IEEE, Paper No. PCIC-2011-41, 8 pages.
Steven C. Carlson, Weaponizing IPRs, Landslide, Sep. 22, 2019, 10 pages.
Style W77 Ags Flexible Coupling, Victaulic Company 2015, https://web.archive.org/web/20150423052817/http://www.victaulic.com:80/en/products-services/products/style-w77-ags-f. . . , 1 page.
T. W. Pascall et al., "Navigating the Test Requirements of API 541 4th Edition," 2007, IEEE, Paper No. PCIC-2007-11, 12 pages.
Testimony of Judge Paul R. Michel (Rel.) United States Court of Appeals for the Federal Circuit Before the Subcommittee on Intellectual Property, U.S. Senate Committee on the Judiciary, Jun. 4, 2019, 8 pages.
Thorndike Saville, The Victaulic Pipe Joint, Journal of American Water Works Association, Nov. 1922, vol. 9, No. 6, pp. 921-927.
Tmeic, Tmeic Industrial Motors Manual, 2012, 12 pages.
Toshiba, Toshiba Q9 Asd Installation and Operation Manual, Apr. 2010, 233 pages.
Transcend Shipping Systems LLC v Mediterranean Shipping Company SA, Case No. 6:21-cv-00040, Document 27, Order of Dismissal with Prejudice, Dec. 7, 2021, 1 page.
Transcend Shipping Systems, LLC and Hapag-Lloyd AG and Hapag-Lloyd (America) LLC, CMA CGM (America) LLC and CMA CGM SA, Mediterranean Shipping Company SA, Case Nos. 6:20-cv-1195-ADA, 6:21-cv-0018-ADA, and 6:21-cv-0040-ADA, Document 19, Proposed Amended Scheduling Order, Aug. 13, 2021, 6 pages.
U.S. Department of Labor—Occupational Safety and Health Administration, Hazard Alert—Worker Exposure to Silica during Hydraulic Fracturing, 2012, 7 pages.
U.S. Department of Labor—Occupational Safety and Health Administration, https://web.archive.org/web/20150406152927/https:/Jwww.osha.gov/, 4 pages.
U.S. Department of Labor—Occupational Safety and Health Administration, Hydraulic Fracturing and Flowback Hazards Other than Respirable Silica, 27 pages.
U.S. Department of Labor—Occupational Safety and Health Administration, OSHA and NIOSH issued hazard alert on ensuring workers in hydraulic fracturing operations have appropriate protections from silica exposure, Jun. 21, 2012, 4 pages.
U.S. Well Services—Services, http://uswellservices.com/services/, accessed Nov. 13, 2021, 10 pages.
U.S. Well Services Investor and Analyst Update: Second Quarter 2021 in Review, 2021, 7 pages.
Victaulic Couplings Vibration Attenuation Characteristics, Victaulic, Publication 26.04, Oct. 2014, 5 pages.
Warren Electric Corp., Hydraulic heaters maintain fluid quality and consistency, Hydraulics & Pneumatics, Dec. 30, 2010, 12 pages.
Wire Rope Isolator Technologies, Enidine, Dec. 2011, 78 pages.
World's Best Swivel Joints, Flowvalve, 2013, https://web.archive.org/web/20150117041757/http://www.flowvalve.com:80/swivels, 10 pages.
Zeus Electric Pumping Unit, Halliburton, http://www.halliburton.com/en/products/zeus-electric-pumping-unit, 2021, 4 pages.
File Wrapper of U.S. Appl. No. 62/180,289, 32 pages.
File Wrapper of U.S. Appl. No. 62/204,331, 22 pages.
File Wrapper of U.S. Appl. No. 62/242,173, 17 pages.
File Wrapper of U.S. Appl. No. 62/242,566, 34 pages.
File Wrapper of U.S. Appl. No. 62/323,168, 41 pages.
File Wrapper of U.S. Appl. No. 62/323,303, 62 pages.
File Wrapper of U.S. Pat. No. 9,410,410, Excerpt-Response to Non-Final Office Action filed Feb. 3, 2016, 57 pages.

(56) References Cited

OTHER PUBLICATIONS

Final Office Action issued in corresponding U.S. Appl. No. 16/210,749 dated Jun. 11, 2019.
Final Office Action mailed Jan. 21, 2021 in U.S. Appl. No. 16/458,696.
Final Office Action mailed Mar. 31, 2020 in related U.S. Appl. No. 15/356,436.
Gardner Denver, 3" 1502 Male Hammer Union Discharge Flange, 2005, 13 pages.
George E. King, "Hydraulic Fracturing 101: What Every Representative, Environmentalist, Regulator, Reporter, Investor, University Researcher, Neighbor and Engineer Should Know About Estimating Frac Risk and Improving Frac Performance in Unconventional Gas and Oil Wells," Feb. 6-8, 2012, Society of Petroleum Engineers, 80 pages.
Halliburton, Halliburton All-Electric Fracturing Reducing Emissions and Cost Brochure, 2021, 6 pages.
Hart Energy, Hydraulic Fracturing Techbook, 2015, 99 pages.
Hazard Alert—Worker Exposure to Silica during Hydraulic Fracturing, United States Department of Labor, https://web.archive.org/web/20120808200919/http://www.osha.gov/dts/hazardalerts/hydraulic_frac_hazard_alert.html, accessed Jun. 13, 2021, 5 pages.
Henry Chajet, "OSHA Issues Alert on Non-Silica Fracking Hazards," Jan. 30, 2015, National Law Review Newsroom, 2 pages.
IEEE 100 The Authoritative Dictionary of IEEE Standards Terms Seventh Edition, 2000, 7 pages.
IEEE Power Engineering Society, 112 IEEE Standard Test Procedure for Polyphase Induction Motors and Generators, 2004, 87 pages.
Industrial Safety & Hygiene News, OSHA issues hazard alert for tracking and drilling, Jan. 6, 2015, 1 page.
Industry/Hazard Alerts, United States Department of Labor, https://web.archive.org/web/20120801064838/http://www.osha.gov:80/hazardindex.html, accessed Jun. 13, 2021, 1 page.
International Search Report and Written Opinion mailed Feb. 11, 2020 in related PCT Application No. PCT/US2019/055323.
International Search Report and Written Opinion mailed Jan. 2, 2020 in related PCT Application No. PCT/US19/55325.
International Search Report and Written Opinion mailed Jul. 22, 2020 in corresponding PCT Application No. PCT/US20/00017.
International Search Report and Written Opinion mailed Nov. 26, 2019 in related PCT Application No. PCT/US19/51018.
International Search Report and Written Opinion mailed Sep. 11, 2019 in related PCT Application No. PCT/US2019/037493.
J. C. Wachel et al., "Analysis of Vibration and Failure Problems in Reciprocating Triplex Pumps for Oil Pipelines," The American Society of Mechanical Engineers, Presented at the Energy-Sources and Technology Conference and Exhibition, Dallas, Texas, Feb. 17-21, 1985, 8 pages.
J. Malinowski et al., "Petrochemical Standards A Comparison Between IEEE 841-2001, API 541, and API 547," 2004, IEEE, Paper No. PCIC-2004-22, 8 pages.
Janice Hoppe-Spiers, "Deploying Change," Energy & Mining International, Spring 2017, http://www.emi-magazine.com, 5 pages.
Jim Harris, "U.S. Well Services LLC—Energy and Mining Magazine," Energy & Mining International, Oct. 12, 2021, https://www.emi-magazine.com/sections/profiles/1221-us-well-services-llc, 3 pages.
John A. Camara, PE, Electrical Engineering Reference Manual for the Electrical and Computer PE Exam, Sixth Edition, 2002, 102 pages.
John Daniel, "8.30 DEP Industry Observations: New Flac Fleet; New Fleet Designs Forthcoming," Daniel Energy Partners, Aug. 30, 2020, 13 pages.
Katsuhiko Ogata, Modern Control Engineering: Third Edition, 1997, 2 pages.
*Kirsch Research and Development, LLC* v *Tarco Specialty Products, Inc.*, Case No. 6:20-cv-00318-ADA, Document 62, Memorandum Opinion and Order Granting Defendant's Opposed Motion to Stay Pending Inter Partes Review of the '482 Patent [ECF No. 57], Oct. 4, 2021, 6 pages.

*Ledcomm LLC* v *Signfiy North America Corp.*, Signify Holding B.V., and Signify N.V., Case No. 6:20-cv-01056-ADA, Document 24, Scheduling Order, Aug. 13, 2021, 4 pages.
*LedComm LLC* v *Signify North America Corporation*, Case No. 6:20-cv-01056-ADA, Civil Docket, accessed Dec. 8, 2021, 11 pages.
Lionel B. Roe, Practices and Procedures of Industrial Electrical Design, 1972, McGraw-Hill, Inc., Chapter 2: The Basic Electric System, 11 pages.
Liz Hampton, "Low-cost tracking offers boon to oil producers, headaches for suppliers," Reuters, Sep. 12, 2019, https://www.reuters.com/article/us-usa-oil-electric-fracturing-focus/low-cost-fracking-offers-boon-to-oil-producers-headaches-for-supplies, 11 pages.
Liz Hampton, "U.S. Well Services files e-frac patent lawsuit against Halliburton, Cimarex Energy," Reuters, Apr. 15, 2021, https://www.reuters.com/business/energy/us-well-services-files-e-frac-patent-lawsuit-against-halliburton-cimarex-energy, 10 pages.
M. E. Rahman et al., "Wire rope isolators for vibration isolation of equipment and structures—A review," IOP Conference Series Materials Science and Engineering, Apr. 2015, 12 pages.
M. Hodowanec et al., "Introduction to API Standard 541, 4th Edition—Form-Wound Squirrel Cage Induction Motors—Larger than 500 Horsepower," 2003, IEEE, Paper No. PCIC-2003-33, 9 pages.
Maxwell James Clerk 1868, On Governors, Proc. R Soc. Land., pp. 16270-283.
Michael Quentin Morton, Unlocking the Earth: A Short History of Hydraulic Fracturing (2013), GeoExpro, vol. 10, No. 6, 5 pages.
Mike Soraghan, OSHA issues hazard alert for tracking and drilling, E&E, Dec. 10, 2014, 1 page.
Mohinder L. Nayyar, Piping Handbook Seventh Edition, McGraw-Hill Handbook, 2000, 77 pages.
Moxa 802.11 Ethernet to Serial, Moxastore, http://www.moxastore.com/Moxa_802_11_Wi_Fi_Ethernet_to_Serial_s/587.html, May 24, 2016, 1 page.
National Electrical Manufacturers Association, Nema ICS 61800-4 Adjustable Speed Electrical Power Drive Systems, Part 4: General Requirements—Rating Specifications for A.C. Power Drive Systems above 1000 V a.c. and Not Exceeding 35 kV, 2004 22 pages.
Final Office Action issued in corresponding U.S. Appl. No. 16/170,695 dated Jun. 7, 2019.
Non-Final Office Action issued in corresponding U.S. Appl. No. 16/268,030 dated May 10, 2019.
Non-Final Office Action issued in U.S. Appl. No. 16/404,283 mailed Jul. 21, 2021.
Non-Final Office Action issued in U.S. Appl. No. 14/881,535 mailed May 20, 2020.
Declaration of Dr. L. Brun Hilbert, Jr., P.E., IPR2021-01538, Sep. 22, 2021, 99 pages.
Declaration of Dr. L. Brun Hilbert, P.E., IPR2021-01037 and IPR2021-01038, Jun. 21, 2021, 124 pages.
Declaration of Dr. Mark Ehsani, IPR2021-01035, Jun. 18, 2021, 188 pages.
Declaration of Dr. Mark Ehsani, IPR2021-01066, Jul. 2, 2021, 213 pages.
Declaration of Dr. Robert Durham, Case Nos. IPR2021-01033, IPR2021-01032 and IPR2021-01034, Jun. 18, 2021, 179 pages.
Declaration of Dr. Robert Durham, IPR2021-01065, Jun. 18, 2021, 138 pages.
Declaration of Duncan Hall, Internet Archive, Oct. 26, 2021, https://web.archive.org/web/20140531134153/http://www.amazon.com/StarTech-NETRS2321E-RS-232-Serial-Ethernet/dp/B000YBONOS, 43 pages.
Declaration of Duncan Hall, Jul. 23, 2021, https://web.archive.org/web/20031219231426/http://ppi2pass.com:80/catalog/servlet/MyPpi_pg_aboutppi.html, 12 pages.
Declaration of Joel N. Broussard, Case Nos. IPR2021-01032 & IPR2021-01033, Oct. 13, 2021, 9 pages.
Declaration of Joel N. Broussard, IPR2021-01034, IPR2021-01035, IPR2021-01036, and IPR2021-01037, Oct. 20, 2021, 11 pages.
Declaration of Joel N. Broussard, IPR2021-01038, Oct. 20, 2021, 11 pages.

(56) References Cited

OTHER PUBLICATIONS

Declaration of Joel N. Broussard, IPR2021-01065, Oct. 20, 2021, 11 pages.
Declaration of Nathaniel E. Frank-White, Internet Archive, Feb. 17, 2022, http://web.archive.org/web/20140329090440/http://www.enidline.com/pdffiles/WR_Catalog_2012.pdf, 82 pages.
Declaration of Robert Durham, IPR2021-01315, Aug. 12, 2021, 209 pages.
Declaration of Robert Durham, IPR2021-01316, Aug. 13, 2021, 75 pages.
Declaration of Robert Durham, IPR2022-00074, Nov. 8, 2021, 177 pages.
Declaration of Robert Schaaf, Case Nos. IPR2021-01032 and IPR2021-01033, Oct. 12, 2021, 45 pages.
Declaration of Robert Schaaf, IPR2021-01034, Oct. 20, 2021, 47 pages.
Declaration of Robert Schaaf, IPR2021-01035, Oct. 20, 2021, 51 pages.
Declaration of Robert Schaaf, IPR2021-01037, Oct. 20, 2021, 52 pages.
Declaration of Robert Schaaf, IPR2021-01038, Nov. 10, 2021, 40 pages.
Declaration of Robert Schaaf, IPR2021-01065, Nov. 10, 2021, 33 pages.
Declaration of Robert Schaaf, IPR2021-01066, Nov. 17, 2021, 43 pages.
Declaration of Robert Schaaf, IPR2021-01238, Nov. 17, 2021, 38 pages.
Declaration of Robert Schaaf, IPR2021-01315, Nov. 19, 2021, 39 pages.
Declaration of Robert Schaaf, IPR2021-01316, Nov. 19, 2021, 33 pages.
Declaration of Robert Schaaf, IPR2021-01538, Dec. 28, 2021, 40 pages.
Declaration of Robert Schaaf, IPR2021-01539, Jan. 25, 2022, 37 pages.
Declaration of Robert Schaaf, IPR2022-00074, Feb. 17, 2022, 36 pages.
Declaration of Sylvia D. Hall-Ellis, IPR2022-00610, Feb. 28, 2022, 98 pages.
Declaration of Sylvia D. Hall-Ellis, Ph.D., Case Nos. IPR2021-01032, IPR2021-01033, and IPR2021-01034, Jun. 18, 2021, 173 pages.
The American Heritage Dictionary of the English Language, Fifth Edition, Fiftieth Anniversary, p. 911.
U.S. Well Services, Inc. and U.S. Well Services, LLC v Halliburton Company and Cimarex Energy Co., Case No. 6:21-cv-00367-ADA, Document 1-8, Exhibit H, Halliburton -All Electric Fracturing Reducing Emissions and Cost, Apr. 15, 2021, 6 pages.
U.S. Well Services, Inc. and U.S. Well Services, LLC v Halliburton Company and Cimarex Energy Co., Case No. 6:21-cv-00367-ADA, Document 51, Agreed Scheduling Order, Sep. 16, 2021, 5 pages.
U.S. Well Services, Inc. and U.S. Well Services, LLC v Halliburton Company and Cimarex Energy Co., Case No. 6:21-cv-00367-ADA, Document 56, Defendants' Opening Claim Construction Brief, Oct. 27, 2021, 46 pages.
U.S. Well Services, Inc. and U.S. Well Services, LLC v Halliburton Company and Cimarex Energy Co., Case No. 6:21-cv-00367-ADA, Document 63, Defendants' Claim Construction Brief in Reply to U.S. Well Services, LLC's Responsive Brief, Dec. 2, 2021, 30 pages.
U.S. Well Services, Inc. and U.S. Well Services, LLC v Halliburton Company and Cimarex Energy Co., Case No. 6:21-cv-00367-ADA, Plaintiff U.S. Well Services, LLC's Disclosure of Extrinsic Evidence, Oct. 19, 2021, 10 pages.
U.S. Well Services, Inc. and U.S. Well Services, LLC v Halliburton Company and Cimarex Energy Co., Case No. 6:21-cv-00367-ADA, Plaintiffs Disclosure of Asserted Claims and Preliminary Infringement Contentions, Jul. 12, 2021, 9 pages.

U.S. Well Services, Inc. files suit against Halliburton Company and Cimarex Energy Co. for patent infringement, Apr. 15, 2021, PR Newswire, https://www.prnewswire.com/news-releases/us-well-services-inc-files-suit-against-halliburton-company-and-cimarex-energy-co-for-patent-infringement-301270118.html, 2 pages.
U.S. Well Services, Inc. v Halliburton Company, Case No. 6:21-cv-00367-ADA, Civil Docket, accessed Dec. 13, 2021, 14 pages.
U.S. Well Services, Inc. v Halliburton Company, Case No. 6:21-cv-00367-ADA, Civil Docket, accessed Dec. 17, 2021, 14 pages.
U.S. Well Services, Inc. v Halliburton Company, Civil Docket for Case# 6:21-cv-00367-ADA, https://ecf.txwd.uscourts.gov/cgi-bin/DktRpt.pl?190912742001885-L_1_0-1, Accessed Nov. 29, 2021, 13 pages.
U.S. Well Services, Inc., and U.S. Well Services, LLC v Halliburton Company, Cimarex Energy Co., Halliburton Energy Services, Inc., and Halliburton US Techologies, Inc., Case No. WA:21-CV-00367-ADA, Document 61, Order Resetting Markman Hearing, Dec. 8, 2021, 1 page.
U.S. Well Services, Inc., and U.S. Well Services, LLC v Halliburton Company, Cimarex Energy Co., Halliburton Energy Services, Inc., and Halliburton US Techologies, Inc., Case No. WA:21-CV-00367-ADA, Document 61, Order Setting Markman Hearing, Nov. 29, 2021, 1 page.
U.S. Well Services, LLC v Tops Well Services, LLC and Honghua America, LLC, Case No. 3:19-cv-00237 Document 72-9, Declaration of Dr. Robert Schaaf—part 2, Apr. 24, 2020, 128 pages.
U.S. Well Services, LLC v Tops Well Services, LLC and Honghua America, LLC, Case No. 3:19-cv-00237, Document 1, Plaintiff's Original Complaint, 63 pages.
U.S. Well Services, LLC v Tops Well Services, LLC and Honghua America, LLC, Case No. 3:19-cv-00237, Document 72, Plaintiff's Opening Claim Construction Brief, Apr. 24, 2020, 37 pages.
U.S. Well Services, LLC v Tops Well Services, LLC and Honghua America, LLC, Case No. 3:19-cv-00237, Document 72-9, Declaration of Dr. Robert Schaaf- part 3, Apr. 24, 2020, 47 pages.
U.S. Well Services, LLC v Tops Well Services, LLC and Honghua America, LLC, Case No. 3:19-cv-00237, Document 72-9, Declaration of Dr. Robert Schaaf, Apr. 24, 2020, 52 pages.
U.S. Well Services, LLC v Tops Well Services, LLC and Honghua America, LLC, Case No. 3:19-cv-00237, Document 90, Plaintiff's Opposition to Defendants' Motion for Summary Judgment of Invalidity under 35 USC 112, 30 pages.
"Game-changing hydraulic fracturing technology, reduces emissions by 99%," Intrado Globe News Wire, Oct. 1, 2014, https://www.globenewswire.com/fr/news-release-2014/10/01/670029/10100696/en/Game-changing-hydraulic-fracturing-technology-reduces-emissions-by-99.html, 4 pages.
"Global Cache iTach, IP to Serial with PoE (IP2SL-P)," Global Cache, https://www.amazon.com/Global-Cache-iTach-Serial-IP2SL-P/dp/B003BFVNS4/, Oct. 30, 2014, 3 pages.
"'Kerr Pumps & FlowVale Awards for Excellence in Well Completion, Northeast 2017—Awarded to: U.S. Well Services,' https://www.oilandgasawards.com/winner/northeast-2017-kerr-pumps-flowvale-awards.. ", accessed Oct. 5, 2021, 4 pages.
"New Technology Development Award—General/Products, Northeast 2015—Awarded to: U.S. Well Services, LLC," https://www.oilandgasawards.com/winner/northeast-2015-new-technology-development-award-generalproducts/#, accessed Aug. 23, 2021, 4 pages.
"SainSmart TCP/IP Ethernet to Serial RS232 RS485 Intelligent Communication Converter," SainSmart, http://www.amazon.com/SainSmart-Ethemet-Intelligent-Communication-Converter/dp/B008BGLUHW, Aug. 17, 2014, 4 pages.
"Screenshot of USWS Clean Fleet System Video," 1 page.
"Services—U.S. Well Services," http:f/uswellservices.com/services/, accessed Nov. 13, 2021, 10 pages.
"StarTech NETRS2321E 1 Port RS-232/422/485 Serial over IP Ethernet Device Server," StarTech, http://www.amazon.com/StarTech-NETRS2321E-RS-232-Serial-Ethernet/dp/B000YNONOS, May 31, 2014, 4 pages.

(56) References Cited

OTHER PUBLICATIONS

"StarTech.com 1 Port RS232 Serial to IP Ethernet Converter {NETRS2321P}," StarTech, http://www.amazon.com/StarTech-com-Serial-Ethernet-Converter-NETRS2321P/dp/B00FJEHNSO, Oct. 9, 2014, 4 pages.
"TCP/IP Ethernet to Serial RS232 RS485 RS422 Converter," Ate, http://www.amazon.com/Ethemet-Serial-RS232-RS485-Converter/dp/B00ATV2DX2, Feb. 1, 2014, 2 pages.
"'U.S. Well Services Issues $125.5 Million Convertible Senior Secured PIK Notes, Executes License Agreement with ProFrac Manufacturing, LLC and Finalizes Amendment to Senior Secured Term Loan," Jun. 28, 2021, https://finance.yahoo.com/news/u-well-services-issues-125-203000637.html?guccounter=1, 6 pages.
"VZ Environmental Award of Excellence in Environmental Stewardship, Rocky Mountain 2016-Awarded to: U.S. Well Services, LLC," Oil & Gas Awards, 2016, https://www.oilandgasawards.com/winner/rocky-mountain-2016-vz-environmental-award-for-excellence-in-environmental-stewardship, accessed Aug. 23, 2021, 4 pages.
49 C.F.R Part 393 {Oct. 1, 2006), 36 pages.
A. Abbott, Crippling the Innovation Economy: Regulatory Overreach at the Patent Office, Regulatory Transparency Project, Aug. 14, 2017, 35 pages.
A. B. Lobo Ribeiro et al., "Multipoint Fiber-Optic Hot-Spot Sensing Network Integrated Into High Power Transformer for Continuous Monitoring," IEEE Sensors Journal, Jul. 2008, vol. 8, No. 7, pp. 1264-1267.
A. T. Dufresne, "How reliable are trial dates relied on by the PTAB in the Fintiv analysis?" Perkins Coie, A1214, 3 pages.
Abb, Industry Brochure—ABB drives in chemical, oil and gas medium voltage drives for greater profitability and performance, 2009, 16 pages.
About US, Moxastore, http://www.moxastore.com/aboutus.asp, Mar. 8, 2015, 1 page.
Accommodating Seismic Movement, Victaulic Company, 2015, https://web.archive.org/web/20150412042941/http://www.victaulic.com:80/en/businesses-solutions/solutions/accommoda. . . , 2 pages.
Affidavit of Duncan Hall, Internet Archives on Jun. 7, 2021, https://web.archive.org/web/20120917102614/http:/www.quincieoilfield.com/pdf/3.0%20Gardner"/o20Denver/2500/GD2500Q%200p%20&%20Service%20Manual.pdf, 76 pages.
AGS Large Diameter Solutions, Victaulic Company, 2015, https://web.archive.org/web/20150419063052/http://www.victaulic.com:80/en/businesses-solutions/solutions/advanced-gr. . . , 2 pages.
Amazon.com purchase page for Electrical Engineering Reference Manual for the Electrical and Computer PE Exam, Sixth Edition, https://web.archive.org/web/20070103124447/https:/www.amazon.com/Electrical-Engineering-Reference-Manual-Computer/dp/1888577568/, accessed Jul. 23, 2021, 7 pages.
America Invents Act, H.R. Rep. No. 112-98, Jun. 1, 2011, 165 pages.
American Petroleum Institute, "Form-wound Squirrel-Cage Induction Motors—500 Horsepower and Larger," Jun. 2004, Fourth Edition, ANSI/API Standard 541-2003, 88 pages.
Approved American National Standard, Ansi/Nema Mg Jan. 2011, American National Standard Motors and Generators, Dec. 9, 2021, 636 pages.
Assignment record of U.S. Pat. No. 9,366,114, accessed Aug. 19, 2021, 2 pages.
ASTM International, "Standard Specification for Steel Bars, Carbon and Alloy, Hot-Wrought, General Requirements" Oct. 13, 2006, 16 pages.
Bernard D. Goldstein, The Role of Toxicological Science in Meeting the Challenges and Opportunities of Hydraulic Fracturing, 2014, Toxicological Sciences, vol. 139, No. 2, pp. 271-283.
Bill Lockley and Barry Wood, 'What do the API Motor/Generator Features Cost and What Do They Buy You? 2010 IEEE, Paper No. PCIC-2010-22, 10 pages.
Canadian Office Action issued in Canadian Application No. 3,094,768, mailed Oct. 28, 2021.
Canadian Office Action mailed Aug. 17, 2020 in related CA Patent Application No. 2,944,968.
Canadian Office Action mailed Aug. 18, 2020 in related CA Patent Application No. 2,933,444.
Canadian Office Action mailed Jun. 20, 2019 in corresponding CA Application No. 2,964,597.
Canadian Office Action mailed May 30, 2019 in corresponding CA Application No. 2,833,711.
Canadian Office Action mailed Oct. 1, 2019 in related Canadian Patent Application No. 2,936,997.
Centers for Disease Control and Prevention, NIOSH Numbered Publications, https://web.archive.org/web/20120721180008/http://www.cdc.org/niosh/pubs/all_date_desc_nopubnumbers.html, 2012, 57 pages.
Chiksan Original Swivel Joints, FMC, 1997, 16 pages.
Collins English Dictionary, Twelfth Edition, 2014, p. 1005.
Comprehensive Power: Power it Up, Brochure, 26 pages.
Comprehensive Power: Power it Up, Feb. 27, 2013, 28 pages.
Coors Tek Flowguard Products, 2012, 8 pages.
D. Bogh et al., "A User's Guide to Factory Testing of Large Motors: What Should Your Witness Expect," IEEE, accessed Jun. 10, 2021, 8 pages.
D. Heidel, Safety and Health Management Aspects for Handling Silica-based Products and Engineered Nanoparticles in Sequences of Shale Reservoir Stimulations Operations, Society of Petroleum Engineers, 2004, 4 pages.
D. Nedelcut et al., "On-line and Off-line Monitoring-Diagnosis System {MOS) for Power Transformers," IEEE, 2008 International Conference on Condition Monitoring and Diagnosis, Beijing, China, Apr. 21-24, 2008, 7 pages.
Dani Kass, "Fintiv Fails: PTAB Uses 'Remarkably Inaccurate' Trial Dates," Nov. 2, 2021, Law 360, 1 page.
Department of Transportation, Federal Motor Carrier Safety Administration, 49 CFR Parts 390, 392 and 393 - Parts and Accessories Necessary for Safe Operation; General Amendments; Final Rule, Federal Register, Aug. 15, 2005, vol. 70, No. 156, 49 pages.
Donald G. Fink, "Standard Handbook for Electrical Engineers—Thirteenth Edition," 1993, McGraw-Hill Inc., pp. 10-13, 20-21, 20-22, 20-85, 20-20, 20-89, 20-90, 20-91, 22-12, 22-13, 22-14, 22-15 and 22-16.
Email from Michael See on Jun. 10, 2021 regarding API-541 Fourth Edition: Public Availability, 2 pages.
Eugene A. Avallone et al., "Marks' Standard Handbook for Mechanical Engineers, 11th Edition," 2007, pp. 3-65, 14-2, 14-3, 14-13, 14-14, 20-91, 22-12, 22-13, 22-14, 22-15, 22-16, 10-3, 20-21, 20-22, 20-85, 20-86, 20-89, and 20-90.
Eugene A. Avallone, Marks' Standard Handbook for Mechanical Engineers: 11th Edition, 2007, p. 16-4 and 16-22.
*U.S. Well Services, LLC v Tops Well Services, LLC*, Case No. 3:19-cv-237, Document 135, Order, Sep. 22, 2021, 2 pages.

* cited by examiner

ENCODERLESS VECTOR CONTROL FOR VFD IN HYDRAULIC FRACTURING APPLICATIONS

CROSS REFERENCE TO RELATED APPLICATION(S)

This application is related to and claims the benefit of priority from allowed U.S. patent application Ser. No. 16/873,583, filed May 12, 2020, which in turn is related to and claims the benefit of priority from U.S. Provisional Application 62/847,022, filed May 13, 2019, both titled ENCODERLESS VECTOR CONTROL FOR VFD IN HYDRAULIC FRACTURING APPLICATIONS, and the entire disclosures of both of which are incorporated by reference herein for all intents and purposes.

REFERENCE TO MATERIAL IN COMPACT DISC

The application incorporates by reference, under 37 CFR 1.821(e), the material on a compact disc (CD) submitted in the aforementioned related U.S. patent application Ser. No. 16/873,583, which was submitted as allowed under 37 C.F.R. §§ 1.52 and 1.77(b)(5)) and which is identified as file named "Appendix A Table 1," which is 82.8 KB, created May 8, 2020, in CDs labeled Copies 1 and 2 (the names of the files contained on each of the compact discs, their date of creation and their sizes in bytes), which may be referenced throughout this disclosure as Appendix A.

FIELD

At least one embodiment pertains to improvements in electric motors in fracturing operations. In at least one embodiment, the present disclosure describes fracturing pumps that are coupled to an electric motor, which in turn is controlled via an encoderless vector control subsystem.

BACKGROUND

Hydraulic Fracturing is a process used to stimulate production from some hydrocarbon producing wells. The process involves injecting fluid with pumps into a wellbore at a pressure sufficient to generate fissures in the formation surrounding the wellbore. The pressurized fluid is injected into a portion of the wellbore that is pressure-isolated from the remaining length of the wellbore so that fracturing is limited to a designated portion of the formation. The fracturing fluid slurry, whose primary component may be water, includes proppant (such as sand or ceramic) that migrate into the fractures with the fracturing fluid slurry and remain to prop open the fractures after pressure is no longer applied to the wellbore.

The pumps used in hydraulic fracturing operations may be powered by diesel engines. Recently, however, some pumps may be powered by electric motors, which can in turn be controlled by a variable frequency drive (VFD). Use of these electric motors in hydraulic fracturing pumps may not achieve smooth operation.

SUMMARY

In at least one embodiment, a system for use in fracturing operations is disclosed. The system includes an electric motor, a turbine generator, an encoderless vector control subsystem, and at least one pump. The turbine generator is adapted to generate electric power for the system. The encoderless vector control subsystem is adapted to receive the electric power from the turbine generator and to control the electric motor using determined parameters provided to the encoderless vector control subsystem. The at least one pump is adapted to receive torque input from the electric motor.

In at least one further embodiment, a method for using electric pumps in fracturing operations is also disclosed. The method includes engaging an electric motor with a turbine generator. The method also includes enabling an encoderless vector control subsystem to receive electric power from the turbine generator. The method includes a sub-process to control the electric motor using determined parameters input to the encoderless vector control subsystem. The determined parameters may be based in part on vibration induced in a feature associated with the turbine generator, such as the body of the turbine. At least one pump is engaged with the electronic motor in a further sub-process of the method so that the torque input from the electric motor may operate the at least one pump.

BRIEF DESCRIPTION OF THE DRAWINGS

The present disclosure will be readily understood upon reading the detailed description of non-limiting embodiments of the present disclosure with the accompanying drawing, in which.

DETAILED DESCRIPTION

Figure 1A:
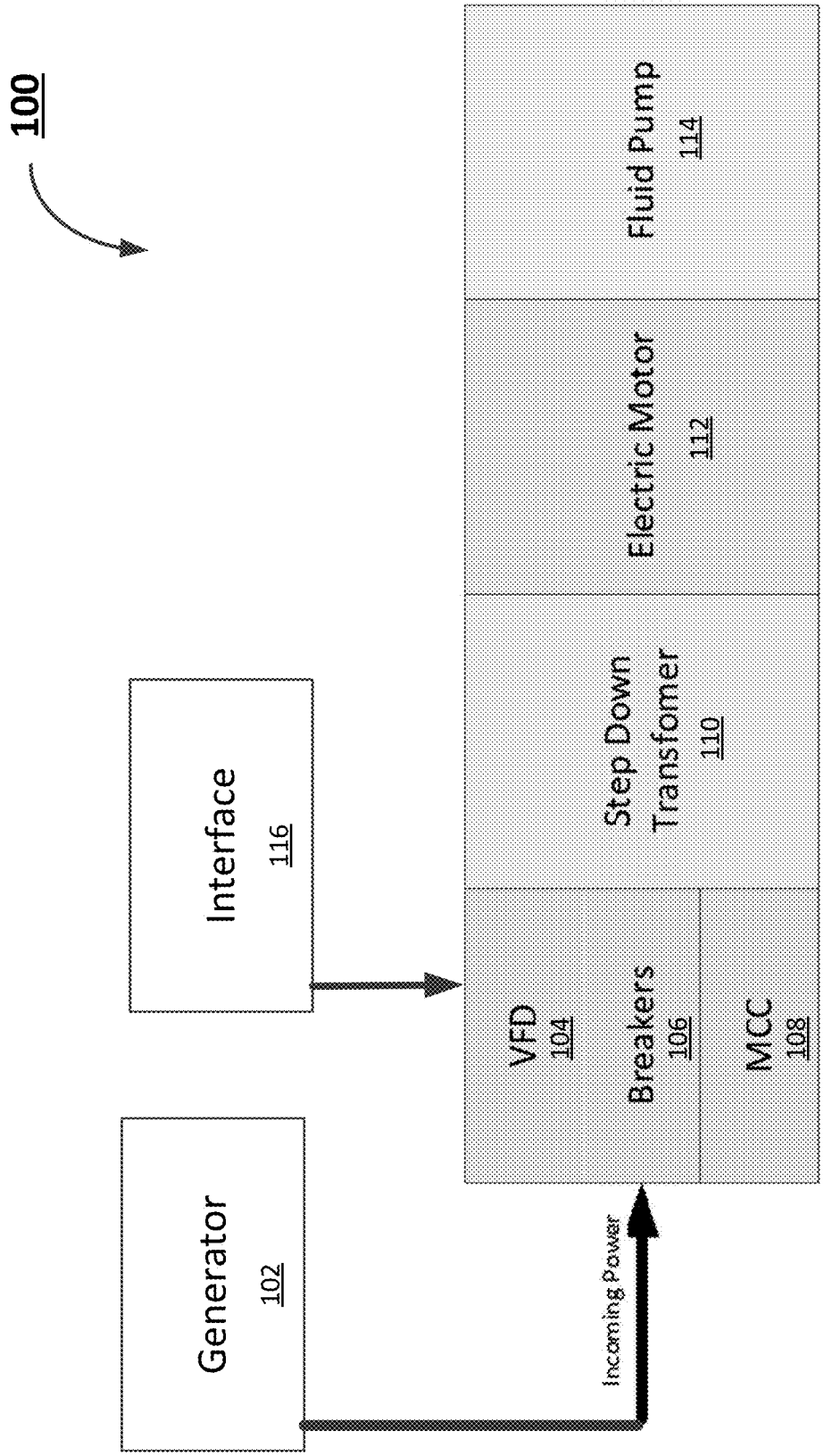
FIG. 1A is a block diagram of a system, as positioned on a trailer and used in a hydraulic fracturing operation with encoderless vector control, according to at least one embodiment of the present disclosure.

The foregoing aspects, features, and advantages of the present technology will be further appreciated when considered with reference to the following description of preferred embodiments and accompanying drawing, wherein like reference numerals represent like elements. In describing the preferred embodiments of the technology illustrated in the appended drawing, specific terminology will be used for the sake of clarity. However, the technology is not intended to be limited to the specific terms used, and it is to be understood that each specific term includes equivalents that operate in a similar manner to accomplish a similar purpose.

Non-oil and gas related applications may implement a VFD to power an electric motor in fluid applications, such as fluids having consistent properties. In an instance, the fluids may be air or clean water. However, in fracturing operations, variable loads may exist because of the inconsistency of the materials involved. A further driver of variable loads may be an unpredictable formation pressure which can vary by several thousand PSI (pounds per square inch) and the fracturing process itself, which nay require fluid rate changes throughout the process. Further, in fracturing operations, electric motors may be expected to power a high number (e.g., 10 to 20) of hydraulic fracturing pump. In addition, the present disclosure is also able to address adaptions and configurations directed to a single electric motor powering a single pump, multiple smaller electric motors powering a single pump, or a single electric motor powering two pumps. These different adaptions and configurations may be additionally challenging to the fracturing process by adding further uncertainties.

Still further, the hydraulic fracturing pumps may be driven by an electric motor that is manifolded together with common suction and discharge piping systems. As such, in addition to the inconsistencies of the fluid involved in a fracturing operation, the fluid dynamics generated as a result of the group of hydraulic fracturing pumps working together off of an electric motor may cause rough operation of the electric motor and may result in bad pump performance. For instance, discharge flow ripples may be caused by triplex, quintuplex, novemplex, and septuplex plunger pumps, which are the predominant type of pumps used in hydraulic fracturing, Additional fluid dynamics that might disrupt smooth operation of the electric motor may be also caused during the well formation process itself. The act of fracturing and the pumped fluid, as well as returning fluid, are additional fluid dynamic effects that need addressing to enable the electric motor to perform smoothly. Other phenomena regarding the interaction of other connected equipment on the surface, in fracturing operations, can also affect a VFDs control behavior. For instance, the surface equipment's natural frequencies may be excited by the fluid dynamics or the electrical harmonics within the connected equipment.

Still further, observations are made of oscillations or vibrations in a body of a turbine portion of the turbine generator during operation of the turbine and electric motor system for hydraulic fracturing operations. In at least one embodiment, the oscillations or vibrations in the body may be more apparent in a shaft and in an associated coupler that extends or connects the turbine portion of the turbine generator to the generator portion. The oscillations or vibrations represent mechanical resonance of components of at least the turbine, but can also cause mechanical resonance in other parts of the system. The mechanical resonance at least on the shaft of the turbine generator is apparent in higher amplitude oscillations resulting from higher torque fluctuations of the shaft. This may be a result of feedback received from the load variation on electric motor. The resonance leads, eventually, to failure of at least the coupler in the turbine generator, but can also damage other parts of the system.

These and other challenges in hydraulic fracturing operations may be addressed by the present disclosure using determined parameters asserted in an encoderless vector control scheme for VFD control in an electric motor. In at least one embodiment, the encoderless vector control scheme of the present disclosure includes determining parameters suited for the electric motor that are based in part on vibrations induced in a feature associated with the turbine generator. For instance, the vibrations may be induced in a portion of the body of turbine and may be apparent on a shaft or a coupler of the turbine generator. The determined parameters may be determined based in part on monitoring oscillation alarm values representing the vibrations in features of the turbine generator that are made apparent at the shaft or the coupler, among other end features of the system. In at least one embodiment, the vibrations are monitored on one or more body portions of the turbine part of the turbine generator.

Figure 5:
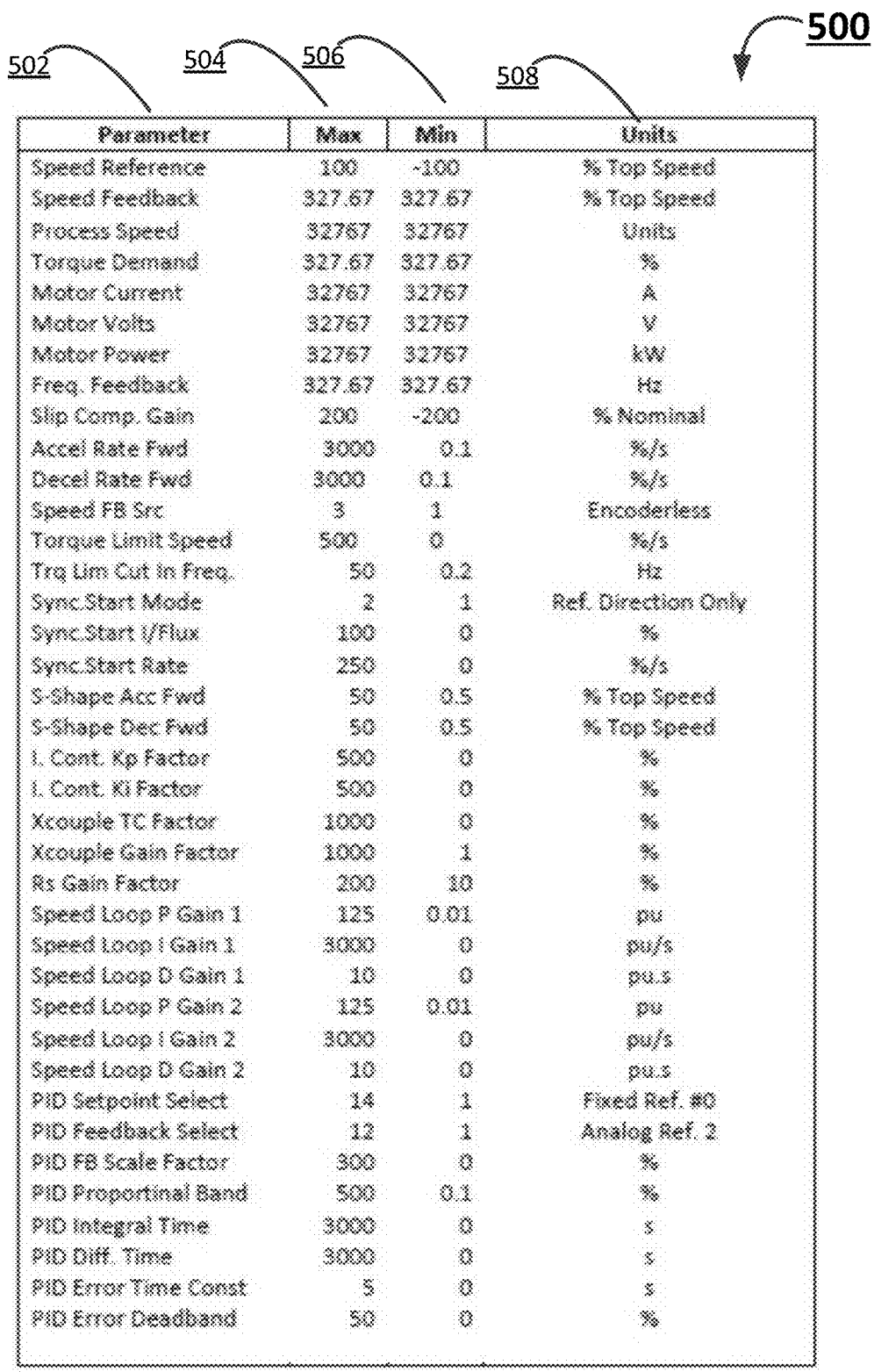
FIG. 5 illustrates select determined parameters and associated values within the encoderless vector control for a VFD used in hydraulic fracturing operations, according to at least one embodiment of the present disclosure.

As such, in at least one embodiment, the oscillation alarm values represent vibration in at least one part of the system for a period of time. The oscillation alarm values may be within a range of about 15 to about 45 upon engagement of the motor with a load for the period of time. In at least one embodiment, the encoderless vector control scheme includes determining parameters suited for the electric motor based in part on the oscillation alarm values being at least less than about 70 upon engagement of the motor with a load. In at least one embodiment, the determined parameters for the encoderless vector control subsystem are selected from at least speed values, motor values, and proportional-integral-derivative (PID) control values, among other values listed in Appendix A (referencing table 1) of the present disclosure under minimum and maximum values that may work to reduce the oscillation alarm values with the encoderless vector control scheme applied to the hydraulic fracturing system. As such, Appendix A is incorporated by reference herein to illustrate other parameters that may be used to form the determined parameters, as well as their associated range of values available to enable the encoderless vector control subsystem of the present disclosure. FIG. 5 provides example predetermined parameters from Appendix A, and their associated range of values to enable an embodiment of the encoderless vector control subsystem of the present disclosure.

Encoderless vector control schemes for VFDs are provided herein to support smooth operation in high-performance electric motor over an entire speed range, to enable capability of the electric motor to generate full torque at zero speed, to improve high dynamic performance for the electric motor, and to support fast acceleration and deceleration in the electric motor. The present disclosure adapts such requirements to the benefit of hydraulic fracturing operations. In at least one embodiment, vector control in an encoderless vector control subsystem refers to a control method for electric motors via the VFD, for instance, in which certain motor input components may be referenced by its vector. The vectors may include complex current or voltage values, for instance. In at least one embodiment, reference to encoderless is made in the encoderless vector control subsystem to indicate that the determined parameters are predetermined by at least an estimation conducted, such as in a testing environment using available parameters in the system to maintain vibrations below a threshold. In at least one embodiment, the vibrations may be measured using the oscillation alarms and the thresholds set using the oscillation alarms.

FIG. 1A is a block diagram of system 100 that is positioned on a trailer and used in a hydraulic fracturing operation with encoderless vector control, according to at least one embodiment of the present disclosure. As such, the layout in FIG. 1A reflects how the system components may be positioned but not necessarily the flow of electric current or power, for instance, which is other described elsewhere throughout this description. The system 100 includes one or more generators 102 for generating power for an electric motor 112. The one or more generators may include a natural gas-powered generator. In at least one embodiment, the one or more generators may include a turbine generator. The system 100 also includes a pump, such as a fluid pump 114, to perform the hydraulic fracturing operation; a variable frequency drive (VFD) 104 for controlling the electric motor; breakers 106 to handle overloads and overdraw situations; and a motor control center (MCC) 108 for control of electrical sub-systems, including blower motors, coolant pumps, lube oil pumps, lighting, heaters, control power, receptacles, and fan motors.

In at least one embodiment, the pump 114 is configured for pumping the hydraulic fracturing fluid into a well and the associated formation. In addition, the pump 114 is adapted or configured for high pressure pumping so as to enable fracturing of the formation. The electric motor 112 may be coupled to the electric pump 114 via a high-strength steel or steel alloy shaft. One or more of these system components may be housed on main or auxiliary trailers so that they remain mobile.

In at least one embodiment, the MCC 108 may support the breakers 106 by a monitoring action. The breakers 106 support distribution of power from the generators to components of varied load requirements. In at least one embodiment, the components may be other than the system components, and may be equipment used at a wellsite, include lights, heaters, blowers, small pumps, control computers, and motors. Shorts or high draws from a load asserted through one or more of the breakers may cause the breakers 106 to trip for protection.

In at least one embodiment, a transformer 110 may be located on one or more trailer after the VFD 104 and prior to the electric motor 112, which may be on the same or different trailers. However, the location of the components on one or more trailers has no effect on the flow of current or power which is described separately. For instance, the generator generates electricity that may be input to VFD 104 through breakers, if needed, irrespective of the location of these components. Cables may be used to connect the various components irrespective of their locations on or off one or more trailers. As the generator 102 may support other components requiring power then the electric motor 112, the generator 102 may provide the required voltage via MCC 108. The transformer 110 steps down the voltage provided from the generator 102, for the VFD 104, the MCC 108, and the electric motor 112 to a manageable voltage handled by these components. The electric motor 112 drives the electric pump 114 to perform the requisite fracturing operations. In at least one embodiment, the electric motor 112 may be an induction motor or a permanent magnet motor.

In at least one embodiment, interface 116 may be used to provide the determined parameters to the VFD 104 or another component having at least a memory having instructions and a processor for executing the instructions to perform functions. In at least one embodiment, the memory may also store the determined parameters. In at least one embodiment, the functions include distributing the determined parameters to various system components for setting the system components according to the determined parameters.

Figure 1B:
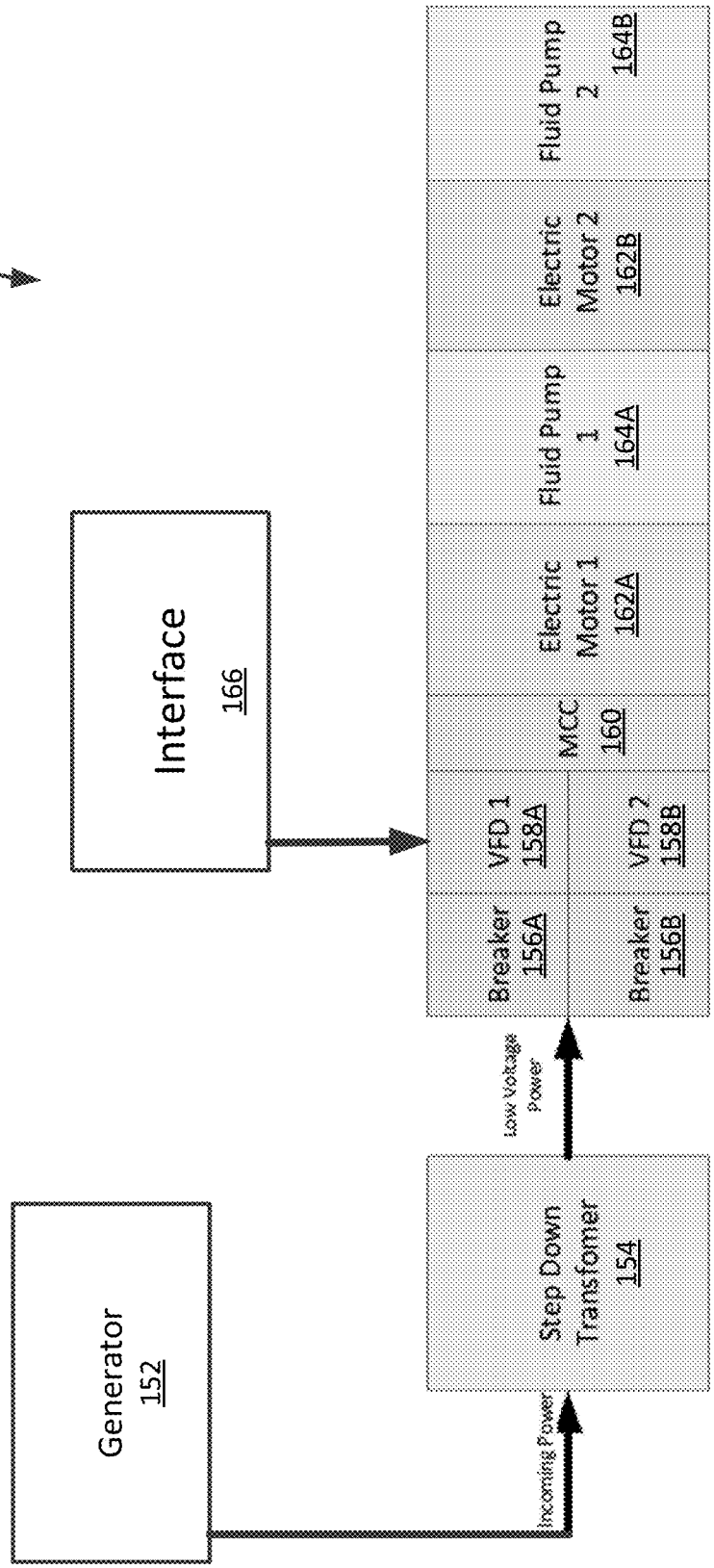
FIG. 1B is another block diagram of a system, as positioned on a trailer and used in a hydraulic fracturing operation with encoderless vector control, according to at least one embodiment of the present disclosure.

FIG. 1B is another block diagram of a system 150 that is positioned on a trailer and used in a hydraulic fracturing operation with encoderless vector control, according to at least one embodiment of the present disclosure. As such and as in the case of FIG. 1, the layout in FIG. 1B reflects how the system components may be positioned, but not necessarily the flow of current or power, which is described elsewhere throughout this description otherwise. In at least one embodiment, as in the system 100, the system 200 of FIG. 1B includes one or more generators 152 for generating power for one or more electric motors 162A, B. The one or more generators 152 may include a natural gas-powered generator. In at least one embodiment, the one or more generators 152 may include a turbine generator. The system 150 also includes one or more pumps, such as a fluid pumps 164A, B, to perform the hydraulic fracturing operation; one or more variable frequency drives (VFDs) 158A, B for controlling the respective electric motors 162A, B; breakers 156A, B to handle respective overloads and overdraw situations associated with a respective electric motor 162A, B; and a motor control center (MCC) 168 for control of electrical sub-systems, including blower motors, coolant pumps, lube oil pumps, lighting, heaters, control power, receptacles, and fan motors.

In at least one embodiment, the pumps 164A, B are individually configured for pumping the hydraulic fracturing fluid into a well. In at least one embodiment, the pumps draw slurry, representing the fracturing fluid, from the blender at a low pressure, boost the slurry to a high pressure for application into the well that connected to the formation. In addition, the pumps 164A, B are individually adapted or configured for high pressure pumping so as to enable cracking of the formation. Furthermore, each electric motor 162A; 162B may be coupled to one or more pumps 164A, B, but each electric motor 162A; 162B may be couple to individual ones of the one or more pumps 164A, 164B. Each electric motor 162A, B may be coupled to the one or more electric pumps 164A, B via a high-strength steel or steel alloy shaft. One or more of these system components may be housed on main or auxiliary trailers so that they remain mobile.

In at least one embodiment, the MCC 160 may support the breakers 156A, B by a monitoring action. The breakers 156A, B support distribution of power from the generator(s) 152 to components of varied load requirements. In at least one embodiment, the components may be other than the system components, and may be equipment used at a wellsite, include lights, heaters, blowers, small pumps, control computers, and motors. Shorts or high draws from a load asserted through one or more of the breakers may cause the breakers 156A, B to trip for protection.

In at least one embodiment of FIG. 1B distinct from the system 100 of FIG. 1A, the transformer 154 may be located on one or more trailers after the generator 102 and prior to the breakers 156A, B or even the VFDs 158A, B, which may be on the same or different trailers. However, the location of the components on one or more trailers has no effect on the flow of current or power which is described separately. For instance, the generator generates electricity that passes through breakers 156A, B and to VFDs 158A, B. As the generator(s) 152 may support other components than illustrated that also require power, the generator 152 may be a high voltage generator. The transformer 154, therefore, steps down the voltage to a manageable voltage handled by the VFD 158A, B, and as required by components coupled to the MCC 160. In at least one embodiment, the electric motor 162A, B may be an induction motor or a permanent magnet motor, as in the system 100 of FIG. 1A.

Furthermore, applying an encoderless vector control scheme within the VFD in the present systems 100; 150 may not solve every one of the above-described problems, but focusing on certain parameters or many (e.g., thousands) of parameters available for control of the system allows for resolution of at least the vibrations, oscillations, or resonance associated with the turbine, the shaft, and/or coupler. In at least one embodiment, determined parameters from the available system parameters are adjusted and set for the application in any given situation, such as before a load is engaged with the system 100; 150. While each component, such as the electric motors 112; 162A, B, or the turbines 102; 152 have ratings or default parameters, these are not defined to the requirements of a hydraulic fracturing system.

In at least one embodiment, a vibration sensor is used with the system 100; 150, for example, at the turbine 102; 152 to determine parameters from the available parameters of the systems' components. In at least one embodiment, the determined parameters are coded into the VFD prior to engaging the electric motor with the respective electric pump. In at least one embodiment, the assertion of the determined parameters for of the VFD may override the default settings for the systems' components. The determined parameters have a range of settings that are, therefore, enable proper tuning of the electric motor for the hydraulic fracturing application, to obtain desired motor control behaviors. The tuned set of parameters described in concurrently submitted Appendix A forms part of this disclosure and may be selected based in part on monitoring vibration from various points of the turbine.

In at least one embodiment, the encoderless vector control scheme utilizes parameters associated with respective VFDs to enable an electric motor to drive a hydraulic fracturing pump smoothly over the motor's entire speed range, to generate full torque at zero speed, and to have high dynamic performance, including fast acceleration and deceleration of the hydraulic fracturing pumps. Also, natural frequencies present in the connected equipment may be isolated by the VFD having the determined parameters, and any excitement previously in the system 100; 150 may be limited after adopting encoderless vector control scheme as demonstrated by the discussion in at least FIG. 4, where specific tuned parameters or determined parameters were applied after monitoring effects of the vibration at the turbine. The determined parameters are not excited or affected during operation of the system 100; 150 after adopting encoderless vector control.

In at least one embodiment, interface 166, as in the case of the embodiment in FIG. 1A may be used to provide the determined parameters to the VFD 158A, B or another component having at least a memory having instructions and a processor for executing the instructions to perform functions. In at least one embodiment, the memory may also store the determined parameters. In at least one embodiment, the functions include distributing the determined parameters to various system components for setting the system components according to the determined parameters.

Figure 1C:
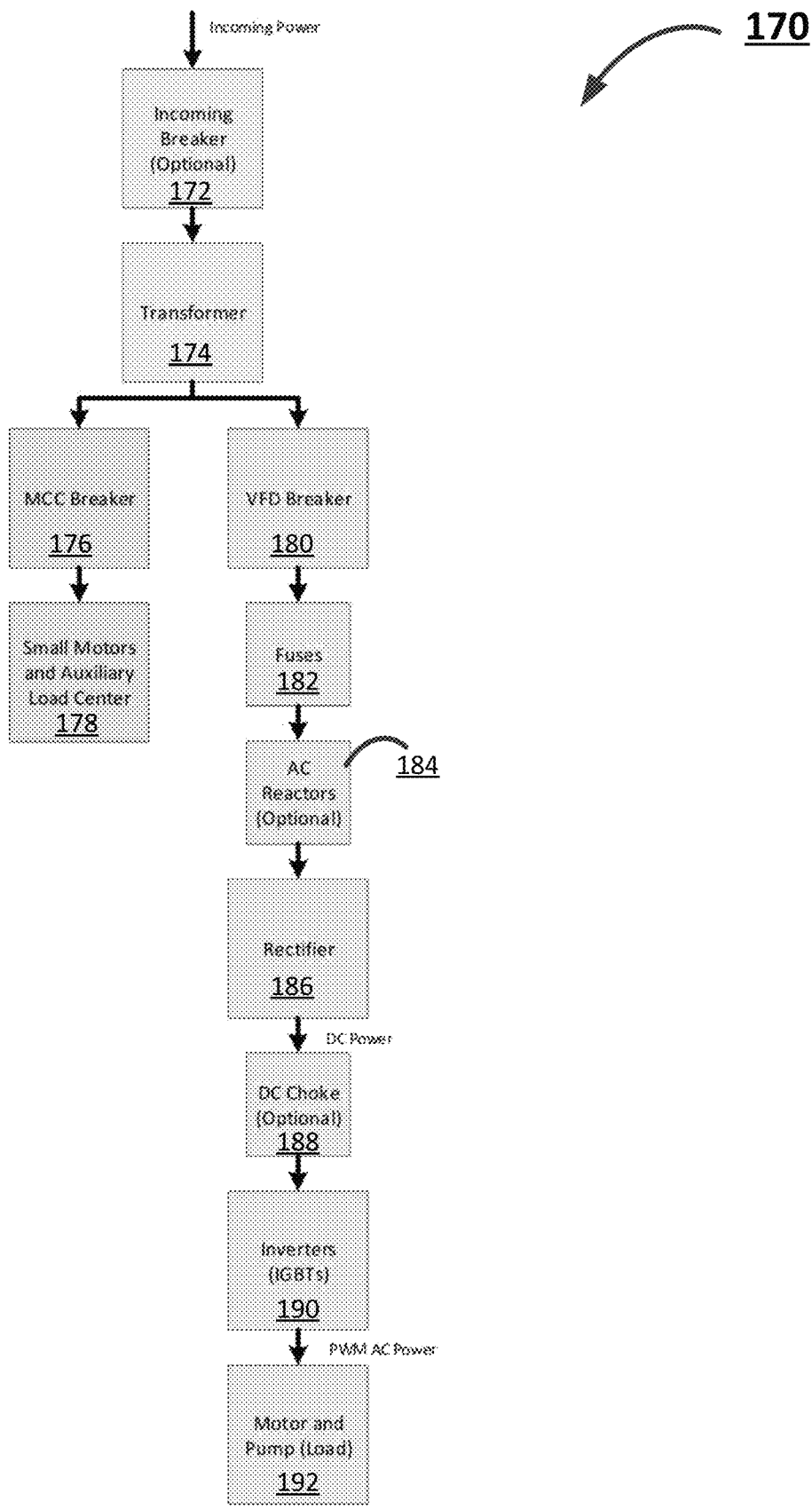
FIG. 1C is another block diagram of a system, as positioned on a trailer and used in a hydraulic fracturing operation with encoderless vector control, according to at least one embodiment of the present disclosure.

FIG. 1C is another block diagram of a system 170, as positioned on a trailer and used in a hydraulic fracturing operation with encoderless vector control, according to at least one embodiment of the present disclosure. Incoming power, from a generator, for instance, may pass through an incoming breaker 172. The incoming breaker 172 is optional as noted. A transformer 174 steps down the voltage of the income power from the generator. The transformer may feed one or more components. As illustrated, a further breaker in the form of an MCC breaker 176 enables power from the transformer to reach auxiliary components 178. These components 178 include one or more small motors and an auxiliary load center. The transformer may separately or concurrently feed a VFD through VFD breakers 180 and fuses 182. One or more of these breakers and fuse may be optional. The VFD is illustrated as one or more of components 184-190. The VFD may include an alternating current (AC) reactor 184, a rectifier 186, a direct current (DC) choke 188, and one or more inverters 190 that may be an IGBT (insulated-gate bipolar transistor)-type inverter. The rectifier 186 enables conversion of the AC to the DC power, which the inverters 190 then convert to pulse-width-modulated (PWM) AC power. The PWM AC power is used to power the electric pump or motor 192. FIG. 1C also illustrates that parameters from FIG. 5 (or Appendix A) may relate to one or more of the components in FIG. 1C and applied values for the parameters may adapt the operations of one or more of the components in FIG. 1C to reduce vibrations in at least the turbine features discussed with respect to at least FIG. 2.

Figure 2:
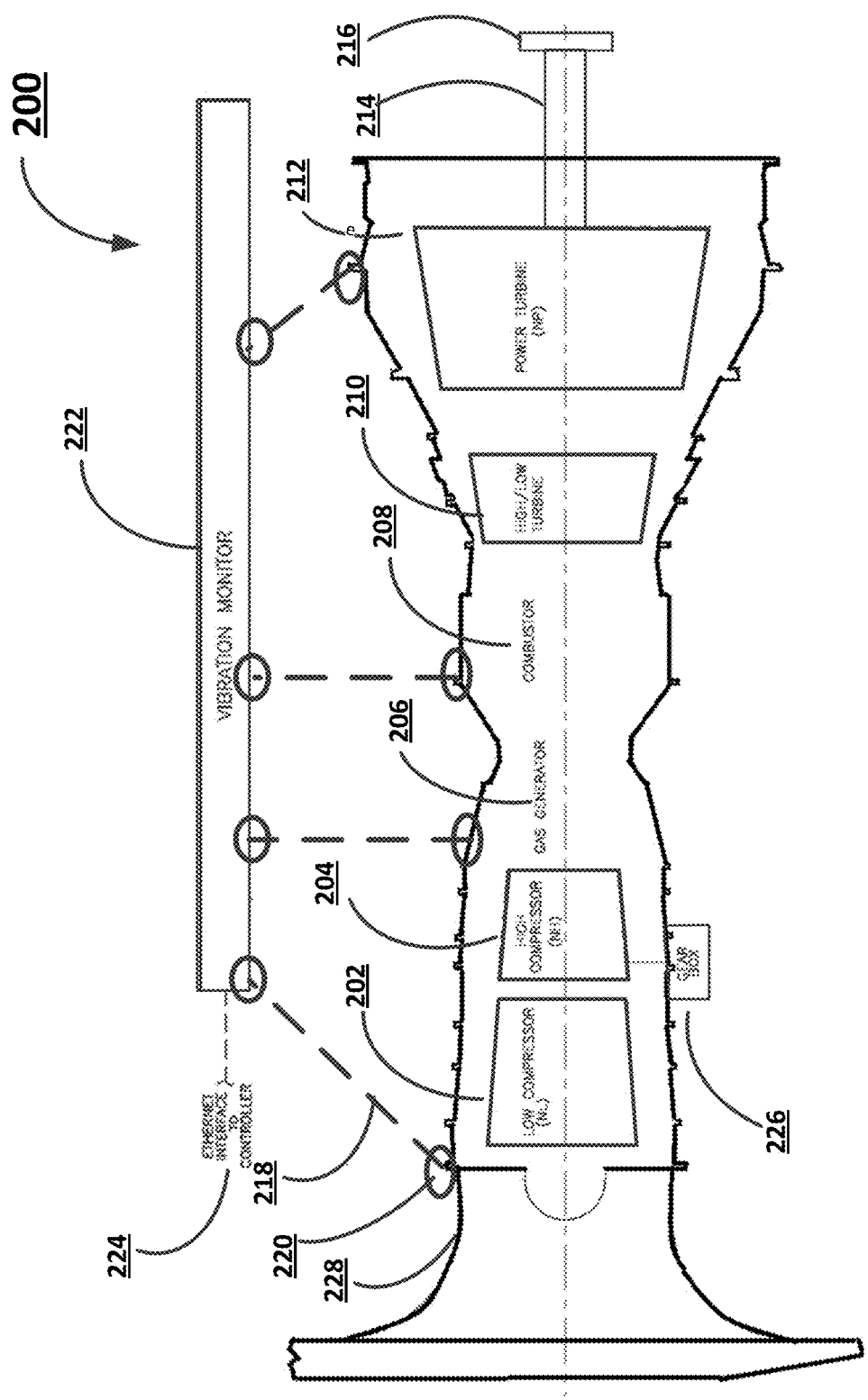
FIG. 2 is a section diagram of a turbine within a system used in a hydraulic fracturing operation and benefiting from encoderless vector control, according to at least one embodiment of the present disclosure.

FIG. 2 is a section diagram of a turbine 200 within a system used in a hydraulic fracturing operation and benefiting from encoderless vector control, according to at least one embodiment of the present disclosure. The turbine 200 includes low compressor section 202, a high compressor section 204, a gas generator section 206, a combustor section 208, a high/low turbine section 210, a power turbine section 212, and a gear box 228 for the high compressor section 204. A shaft 214, along with a coupler 216, translates the generated rotational motion to a generator to provide the electricity requirements for the electric motor.

In at least one embodiment, the turbine 200 is associated with one or more vibration monitors 222, which receive or monitor vibration at one or more sensors 220 (one is marked for reference) at one or more locations throughout the turbine 200. The locations may be on the body 228 adjacent to a section 202-212 within the body or may be directly within the sections. In at least one embodiment, physical connectors (represented in the example by reference numeral 218) carry signals from the one or more sensors 222 to the monitor(s) 220. In at least one embodiment, the vibrations monitored at the one or more locations are apparent on the shaft 214 and/or coupler 216, and may result in damage to the coupler. As such, even though no sensor is provided at the coupler, the monitor 220 provides sufficient information via Ethernet interface 224, for instance, to enable the determine parameters that may be asserted for an encoderless vector control scheme of the present disclosure. In at least one embodiment, FIG. 5 provides examples of determined parameters that may be used in the encoderless vector control scheme.

In at least one embodiment, the monitor 220 provides information pertaining to the oscillation alarms via Ethernet interface 224, for applied determined parameters of the system. The applied determined parameters are qualified for use with a similar application, under a similar configuration, as the determined parameters for the VFD to ensure that the vibrations are the least possible, as reflected by the oscillation alarms being reduced in reference to at least FIG. 4.

Figure 3:
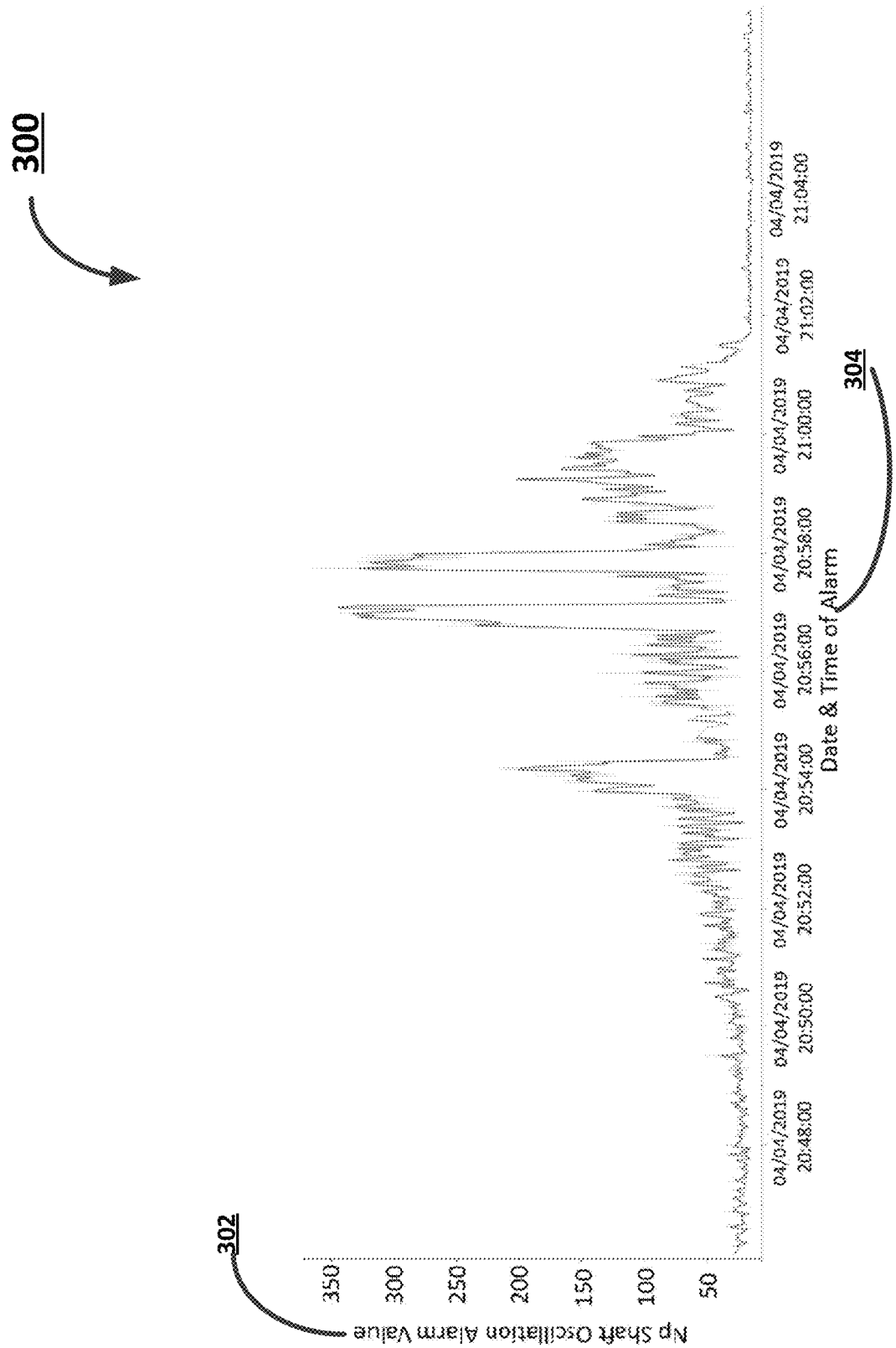
FIG. 3 is graph illustrating system vibration and instability of a system for hydraulic fracturing that may benefit from aspects of the present disclosure.

FIG. 3 is graph 300 illustrating system vibration and instability of a system for hydraulic fracturing that may benefit from aspects of the present disclosure. The y-axis 302 represents Number of Shaft Oscillation Alarm Values and the x-axis 304 represents Date and Time of Alarm, when an oscillation alarm occurs. In at least one embodiment, the oscillation alarm represents a monitored vibration beyond an acceptable vibration set within the monitor 220 of FIG. 2 for each of the one or more locations referenced in FIG. 2. Further, the oscillation alarm represents, in at least one embodiment, vibration that is associated with at least one turbine of a hydraulic fracturing system that may include one or more turbines, generators, or turbine generators.

The graph 300 in FIG. 3 illustrates system vibration and instability prior to implementation of an encoderless vector control scheme. In at least one embodiment, the graph represents the number of oscillation alarms received when the system is in operation over different dates and times as noted in the x-axis of the graph.

As illustrated, further, the instability is pertinently represented by a non-uniform scope of the oscillation alarms. In at least one embodiment, the vertical scale is a dimensionless value or number that is proportional to vibration (rpm/sec) for a portion or at least a feature of the equipment. In at least one embodiment, the feature is on the surface during pumping operations and the value or number may indicate a natural frequency of an excited system under operation. As illustrated the peak of the values in graph 300 approaches 350. A desired value is however lower, for instance, at around 20. At the lower value, instability is reduced or halted when pumping operations are ongoing, but in graph 300, the lower values are obtained only when pumping operations is significantly slowed, which is not desirable during hydraulic fracturing operations.

Figure 4:
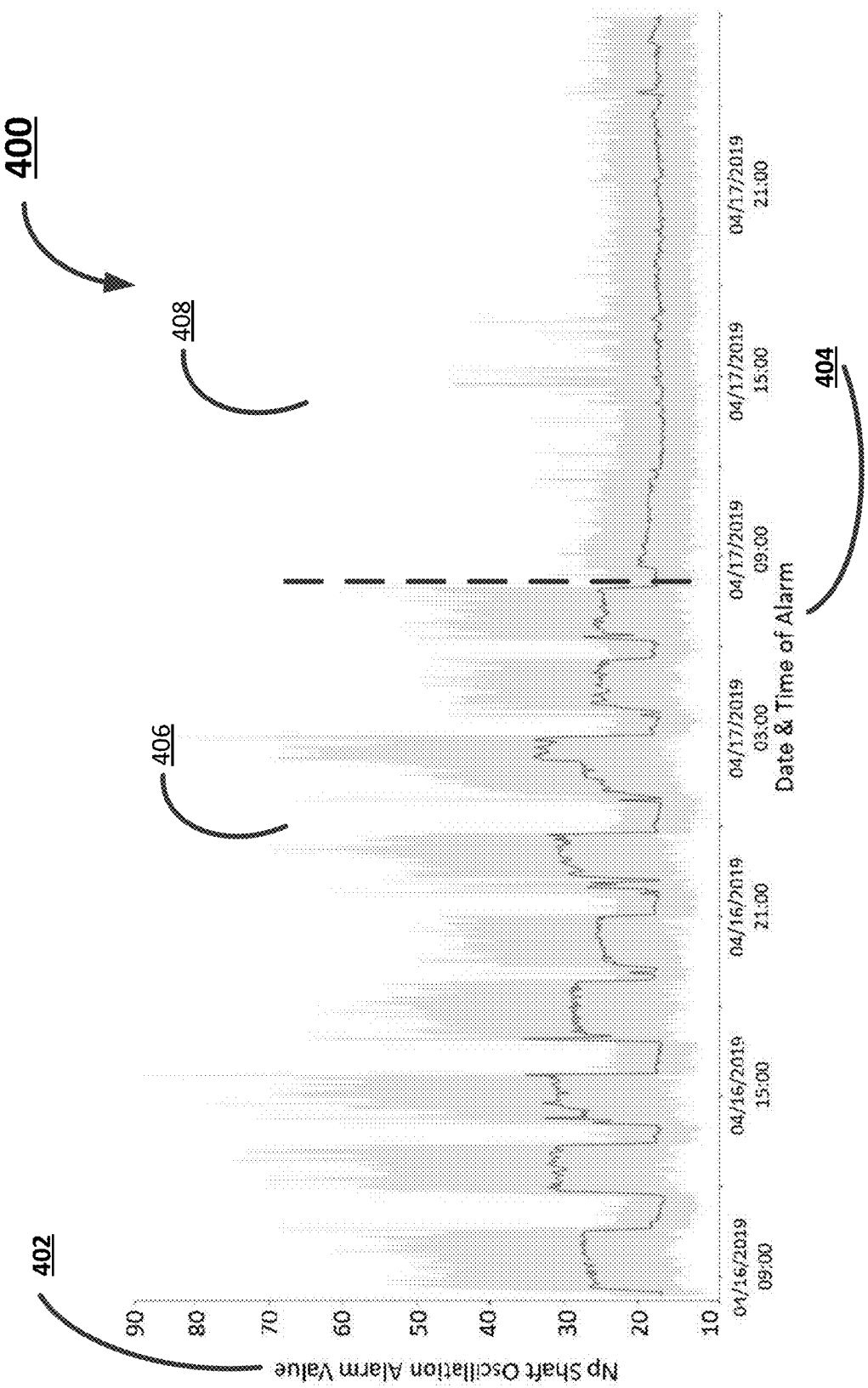
FIG. 4 is a graph illustrating reduced system vibration and increased stability for a system for hydraulic fracturing that implements aspects of the present disclosure.

FIG. 4 is a graph 400 illustrating reduced system vibration and increased stability for a system for hydraulic fracturing that implements aspects of the present disclosure. In at least one embodiment, FIG. 4 illustrates a graph 400 having reduced system vibration and increased stability after implementation of an encoderless vector control scheme. Pertinently, however, even though the scale and dimensions on the x and the y-axes 402, 404 are similar to those of FIG. 3. The left side 406 of the graph 400 represents vibrations present at one or more of the monitored locations referenced in FIG. 2, but with some order, during each individual hydraulic fracturing stage, prior to encoderless vector control being implemented. The right side 408 of the graph 400, on the other hand, represents reduced vibrations monitored at the one or more locations referenced in FIG. 2, after implementation of the encoderless vector control scheme.

In at least one embodiment, the oscillation alarm values in the right side 408 of the graph 400 represent vibration in at least one part of the system for a period of time and may be within a range of about 15 to about 45 upon engagement of the motor with a load for the period of time. In at least one embodiment, the encoderless vector control scheme includes determining parameters suited for the electric motor based in part on the oscillation alarm values being at least less than about 45 or less than about 70 upon engagement of the motor with a load. These values are represented as attainable by the monitoring system indicating graph points within these values on the right side 408 of the graph 400.

FIG. 5 illustrates a table 500 of select determined parameters 502 and corresponding values 504, 506, with units 508, within the encoderless vector control for a VFD used in hydraulic fracturing operations, according to at least one embodiment of the present disclosure. Selected determined parameters 502 represent example parameters that may be tuned or adjusted for the encoderless vector control, at least as input for the VFD. The example parameters include example maximum and minimum values 504, 506, and their units 508. Table 1, in concurrently filed Appendix A, includes a set of further possible encoderless vector control determined parameters and some of the ranges of values that can be implemented for a fracturing pump VFD.

The VFD encoderless vector control system of the present disclosure enable the electric motor to drive a hydraulic fracturing pump in a smooth operating curve over the motor's entire speed range, to generate full torque at zero speed, and to have high dynamic performance, including fast acceleration and deceleration of the fracturing pump. Also, natural frequencies that were present within the connected equipment, and prone to excitation prior to adopting encoderless vector control and the specific tuned parameters, were not prone to excitation after adopting encoderless vector control and tuned parameters.

Figure 6:
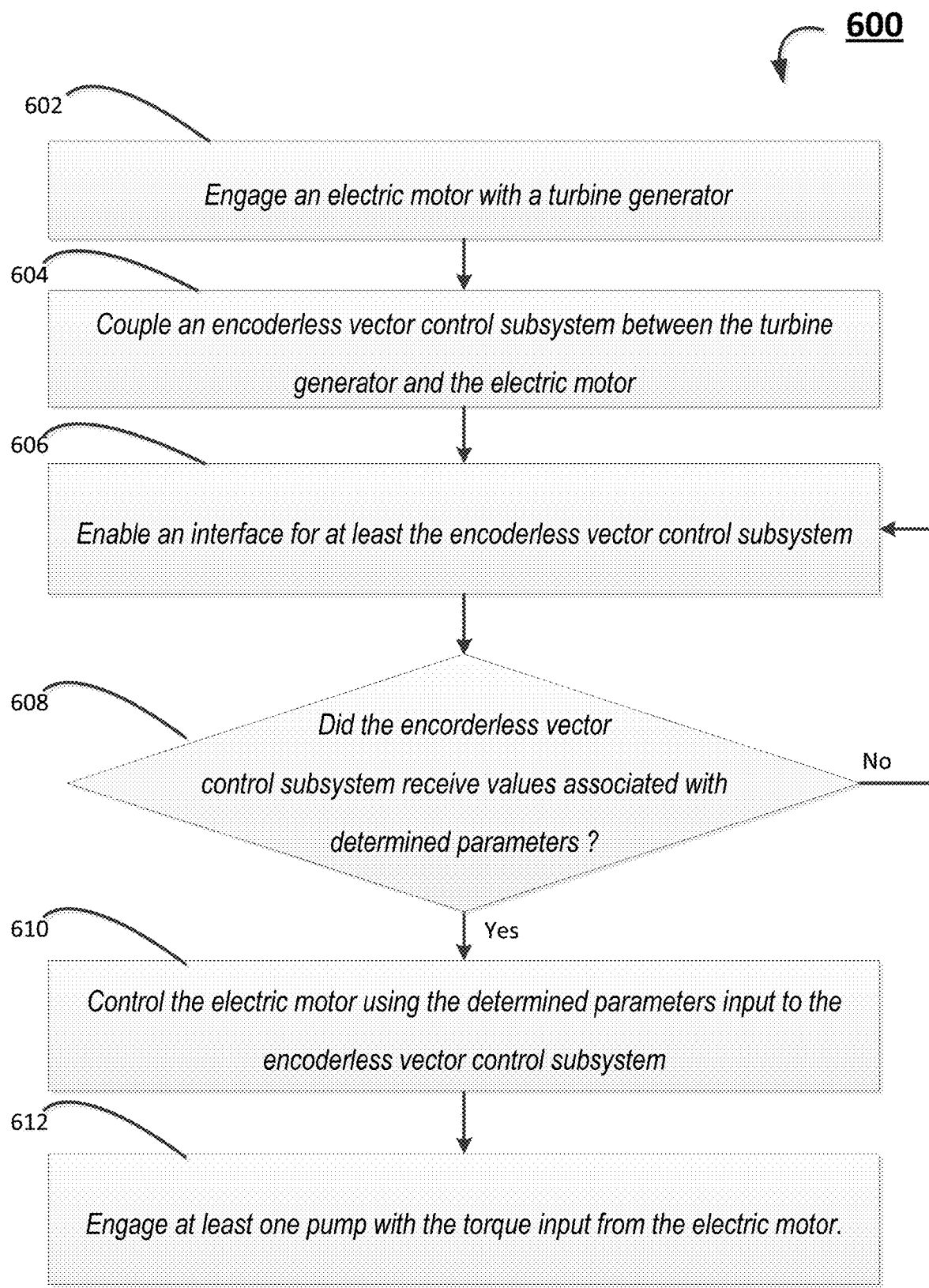
FIG. 6 illustrates a flowchart of a method for encoderless vector control for a VFD used in fracturing operations, according to at least one embodiment of the present disclosure.

FIG. 6 illustrates a flowchart 600 of a method for encoderless vector control for a VFD used in fracturing operations, according to at least one embodiment of the present disclosure. In at least one sub-process 602, an electric motor is engaged with a turbine generator; to receive electric supply indirectly from the turbine generator, for instance. The engagement includes electrical coupling and/or mechanical coupling to associate these two system components together for a fracturing operation. Alternatively, sub-process 602 prepares the turbine generator to generate power by following the required starting and regulating protocols for the turbine generator, for instance. Sub-process 604 couples an encoderless vector control subsystem, such as an encoderless vector control VFD, between the electric motor and the turbine generator. Additional components including breakers and/or transformers may be required and may be recognized and implemented from the disclosure herein, but may be omitted for discussion of FIG. 6.

In at least one embodiment, sub-process 606 enables an interface to receive the determined parameters for the subsystem. In at least one embodiment, the encoderless vector control subsystem includes at least the VFD. The values may be loaded by an executable program or code provided to a machine interface of the VFD or to a component connected to the VFD. As such, the VFD may include or be associated with a processor and a memory including instructions executable by the processor to perform functions for the encoderless vector control subsystem. In at least one embodiment, the functions enable settings for one or more system components of the fracturing system. For instance, speed reference (vales from FIG. 5), motor current, and motor voltage may be all provided from a computer functioning as an interface (e.g., interfaces 116, 166 of FIGS. 1A, 1B), external to the VFD or the system.

Sub-process 608 determines if the encoderless vector control subsystem received values associated with the determined parameters. In at least one embodiment, sub-process 608 may use values from a prior application of the encoderless vector control subsystem to achieve stable operation of the system. Alternatively, sub-process 608 may be applied in a test environment using the vibration sensors and using the monitors previously referenced, prior to method 600 being applied in a real-time environment using the determined parameters from the test environment.

In at least one embodiment, when the determined parameters are available, sub-process 610 controls the electric motor using the determined parameters input to the encoderless vector control subsystem that may include the VFD and may include one or more additional component capable of providing settings for one or more system components of an encoderless vector control system for hydraulic fracturing. Sub-process 612 engages at least one pump with torque input provided from the electric motor when the fracturing operation is performed. Sub-process 606 for the interface remains available for updates to the determined parameters or to override the determined parameters previously provided, for instance.

In at least one embodiment, the system discussed herein for implementing aspects in accordance with various embodiments are computer-based environments having hardware and software capabilities. For instance, a computer-based environment may include human-machine interfaces, processors, memory components, and communication components for receiving input from external computers. Further, different computing environments may be used, as appropriate, to implement various embodiments. External computers may be used to interact with various embodiments and can include any appropriate device operable to send and receive requests, messages, or information over an appropriate network and convey information back to a user of the device. Examples of such external computers may include personal computers, smart phones, handheld messaging devices, laptop computers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections, and combinations thereof using communication component, such as discussed throughout this disclosure.

While the technology has been shown or described in only some of its forms, it should be apparent to those skilled in the art that it is not so limited, but is susceptible to various changes without departing from the scope of the technology. Furthermore, it is to be understood that the above disclosed embodiments are merely illustrative of the principles and applications of the present technology. Accordingly, numerous modifications can be made to the illustrative embodiments and other arrangements can be devised without departing from the spirit and scope of the present technology as defined by the appended claims.

What is claimed is:

1. A system for use in fracturing operations, the system comprising:
   memory comprising instructions; and
   at least one processor to execute the instructions to cause the system to:
   estimate, in a testing environment, values to be associated with parameters associated with vibrations in the system, the vibrations measured using oscillation alarms;
   determine a subset of the parameters based in part on their respective values causing the vibrations to be maintained below a threshold, the threshold to be set using the oscillation alarms; and
   enable an encoderless vector control subsystem to receive electric power from a power source and to control an electric motor for the fracturing operations, based at least in part on the subset of the parameters.

2. The system of claim 1, further comprising:
   a vibration sensor for monitoring the vibrations induced in a feature associated with a turbine of the power source in the testing environment.

3. The system of claim 1, further comprising:
   a vibration sensor associated with a body of the power source for monitoring the vibrations induced in the body of a turbine of the power source, in part, due to a feedback resonance received to the turbine.

4. The system of claim 1, further comprising:
   an encoderless variable frequency drive (VFD) functioning as the encoderless vector control subsystem.

5. The system of claim 1, further comprising:
   a machine interface to receive the subset of the parameters for the encoderless vector control subsystem and to enable application of the subset of the parameters to the electric motor prior to engagement of a load with the electric motor.

6. The system of claim 1, wherein the subset of the parameters for the encoderless vector control subsystem are determined based in part on the oscillation alarm values for the vibrations that occurs over a period of time and within a predetermined range of the oscillation alarm values that is below the threshold.

7. The system of claim 1, wherein the subset of the parameters for the encoderless vector control subsystem are determined based in part on the oscillation alarm values for the vibration that occurs over a period of time and within a predetermined number of the oscillation alarm values that is below the threshold.

8. The system of claim 1, wherein the subset of the parameters for the encoderless vector control subsystem are selected from at least speed values, motor values, and proportional-integral-derivative (PID) control values.

9. The system of claim 1, further comprising:
   one or more triplex, quintuplex, novemplex, or septuplex plunger pumps adapted to receive a torque input from the electric motor.

10. A processor-implemented method for using electric pumps in fracturing operations comprising:
    estimating, in a testing environment and using at least one processor, values to be associated with parameters associated with vibrations in a system for use in fracturing operations, the vibrations measured using oscillation alarms of the system;
    determining a subset of the parameters based in part on their respective values causing the vibrations to be maintained below a threshold, the threshold to be set using the oscillation alarms; and
    enabling an encoderless vector control subsystem to receive electric power from a power source and to control an electric motor for the fracturing operations, based at least in part on the subset of the parameters.

11. The method of claim 10, further comprising:
    monitoring, using a vibration sensor, the vibrations induced in a feature associated with a turbine of the power source in the testing environment.

12. The method of claim 11, further comprising:
    monitoring, using a vibration sensor associated with a body of the power source, the vibrations induced in the body of a turbine of the power source, in part, due to a feedback resonance received to the turbine.

13. The method of claim 10, further comprising:
    using an encoderless variable frequency drive (VFD) as the encoderless vector control subsystem.

14. The method of claim 10, further comprising:
    enabling a machine interface to receive the subset of the parameters for the encoderless vector control subsystem; and
    applying, using the at least one processor, the subset of the parameters to the electric motor prior to engagement of a load with the electric motor.

15. The method of claim 10, wherein the subset of the parameters for the encoderless vector control subsystem are determined based in part on the oscillation alarm values for the vibrations that occurs over a period of time and within a predetermined range of the oscillation alarm values that is below the threshold.

16. The method of claim 10, wherein the subset of the parameters for the encoderless vector control subsystem are determined based in part on the oscillation alarm values for the vibration that occurs over a period of time and within a predetermined number of the oscillation alarm values that is below the threshold.

17. The method of claim 10, wherein the subset of the parameters for the encoderless vector control subsystem are selected from at least speed values, motor values, and proportional-integral-derivative (PID) control values.

18. The method of claim 10, further comprising:
    engaging one or more triplex, quintuplex, novemplex, or septuplex plunger pumps adapted to receive a torque input from the electric motor.

* * * * *